(12) United States Patent
Thiyagarajan et al.

(10) Patent No.: US 7,032,014 B2
(45) Date of Patent: Apr. 18, 2006

(54) SERVICE MANAGEMENT SYSTEM FOR CONFIGURATION INFORMATION

(75) Inventors: Pirasenna Velandi Thiyagarajan, Santa Clara, CA (US); Aravindan Ranganathan, San Jose, CA (US); Mrudil P. Uchil, San Jose, CA (US); Deepa Mahendraker, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 760 days.

(21) Appl. No.: 10/053,986

(22) Filed: Jan. 18, 2002

(65) Prior Publication Data

US 2003/0200288 A1 Oct. 23, 2003

(51) Int. Cl.
 *G06F 15/177* (2006.01)
(52) U.S. Cl. ...................... 709/220; 709/221; 709/222; 709/224
(58) Field of Classification Search ................ 709/220, 709/221, 222, 224
See application file for complete search history.

(56) References Cited

U.S. PATENT DOCUMENTS

| | | | |
|---|---|---|---|
| 2002/0112038 A1* | 8/2002 | Hessmer et al. | 709/220 |
| 2002/0184349 A1* | 12/2002 | Manukyan | 709/221 |
| 2003/0028624 A1* | 2/2003 | Hasan et al. | 709/220 |
| 2003/0051008 A1* | 3/2003 | Gorthy et al. | 709/220 |
| 2003/0105838 A1* | 6/2003 | Presley | 709/220 |

* cited by examiner

*Primary Examiner*—Rupal Dharia
*Assistant Examiner*—Nicholas R. Taylor
(74) *Attorney, Agent, or Firm*—Osha Liang LLP

(57) ABSTRACT

A method for system management of configuration data used by server or groups of servers. In one embodiment, the present invention is comprised of providing information relative to components of the system being managed. A common language is utilized to express the information. An interface is provided to enable inputting of said information. The interface also enables management of the inputted information. In one embodiment, the information is validated during inputting. The validation of inputted information ensures that the information inputted is compliant with a schema of the information. In one embodiment, the information is comprised of defined tasks that are performed by the components of the system. The information is further comprised of specified configurations relative to the defined tasks. The information further comprises a declared schema for representing the information.

29 Claims, 12 Drawing Sheets

150

SERVICE MANAGEMENT SYSTEM FOR CONFIGURATION INFORMATION

FIELD OF THE INVENTION

The present invention relates to the management of configuration information. More particularly, the present invention provides a system of managing servers and their related services, with regard to configuration parameters and task execution.

BACKGROUND OF THE INVENTION

Today's computer networks are usually comprised of multiple interconnected computer systems. Some of the computer systems are configured for use by individuals/users. These computer systems are normally referred to as desktop, laptop, or workstation computer systems. Other computer systems, also present within the network, are configured to facilitate the interaction between the desktop, laptop, and workstation computer systems and the network to which they are connected. These other computer systems are commonly referred to as server computer systems or servers. Additionally, it is common for many of today's large companies to have hundreds or thousands of servers performing a nearly endless variety of tasks and providing a nearly endless variety of services.

The servers contain configuration information, regarding the network and the computer systems connected thereto, which need to be stored and managed. The information can be related to the network, e.g., network addresses, implemented protocols, ethernet types. The information can be related to a computer system connected thereto, e.g., port numbers. The information can be related to electronic mail capabilities, capacities, email protocols, and the like. In fact, servers commonly provide a nearly endless variety of information relative to the network to which they are coupled.

Further, some of the configuration information needs to be shared between the servers that are grouped together. For example, information that may need to be shared can include, e.g., the routing information for bridging between divisions of a company, what back up systems are available, wireless configuration information, and so on. Accordingly, and especially with the advent of the Internet, managing the configuration information for nearly any sized network is of utmost importance.

With all this information scattered throughout the servers within the network, keeping track of all the information is problematic. By virtue of the information not being in one central location or, in many circumstances, not accessible from other access points in the network system, management of the configuration information is difficult.

It is common for each type of configuration information to be in a format specific for that particular information. Accordingly, an administrator needs to be aware of the various types of formatting semantics and structures of the information so that they may manage the information. For example, a company has multiple servers and each of those servers has its own configuration data or format for that server's particular data. If an administrator wants to manage the server, the administrator needs to be able to understand that particular server's format. The server expects its information in a particular format or manner, and if the administrator is not aware of the format, the entered information will not be useful or understandable by the server.

By virtue of the various formatting semantics and formatting structures regarding configuration information, errors in the modification of configuration information are quite common. However, the administrator is usually apprised of any errors in the modification of the configuration information after restarting the server, which causes the administrator to determine which part of the modification caused the error, and then to make the appropriate correction(s). Additionally, some modifications to configuration information cannot be made from all the access points in a network, thus requiring the administrator to change locations to find an access point which will enable the administrator to make appropriate modifications.

SUMMARY OF THE INVENTION

Embodiments of the present invention are drawn to providing a method for managing system configuration information for servers or groups of servers in a networked computer system environment. In one embodiment, the method comprises providing information relative to components in the system being managed. A common language is utilized to express the information. In one embodiment, an interface is provided to enable the inputting of the information. The interface further enables the management of the information. The inputted information is subjected to a validation process. In one embodiment, the validation of the information being inputted is performed during the inputting. In another embodiment, the validation is performed immediately subsequent to the inputting of the information. The validation process ensures that the inputted information complies with a schema relative to the information.

In another embodiment, and in a network environment, a method of server system information management comprises defining the tasks to be performed by the server system in the network. In one embodiment, configurations are specified for the tasks. The configurations comprise parameters related to the tasks. In one embodiment, schemas are declared. The schemas represent the configurations. In one embodiment, a common language is used to define the tasks, specify the configuration, and to declare the schema. In one embodiment, an interface is provided to enable the inputting and management of the information. In one embodiment, a validation of the information being inputted is performed while the information is being inputted. The validation of the information ensures that the information complies with the schema.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
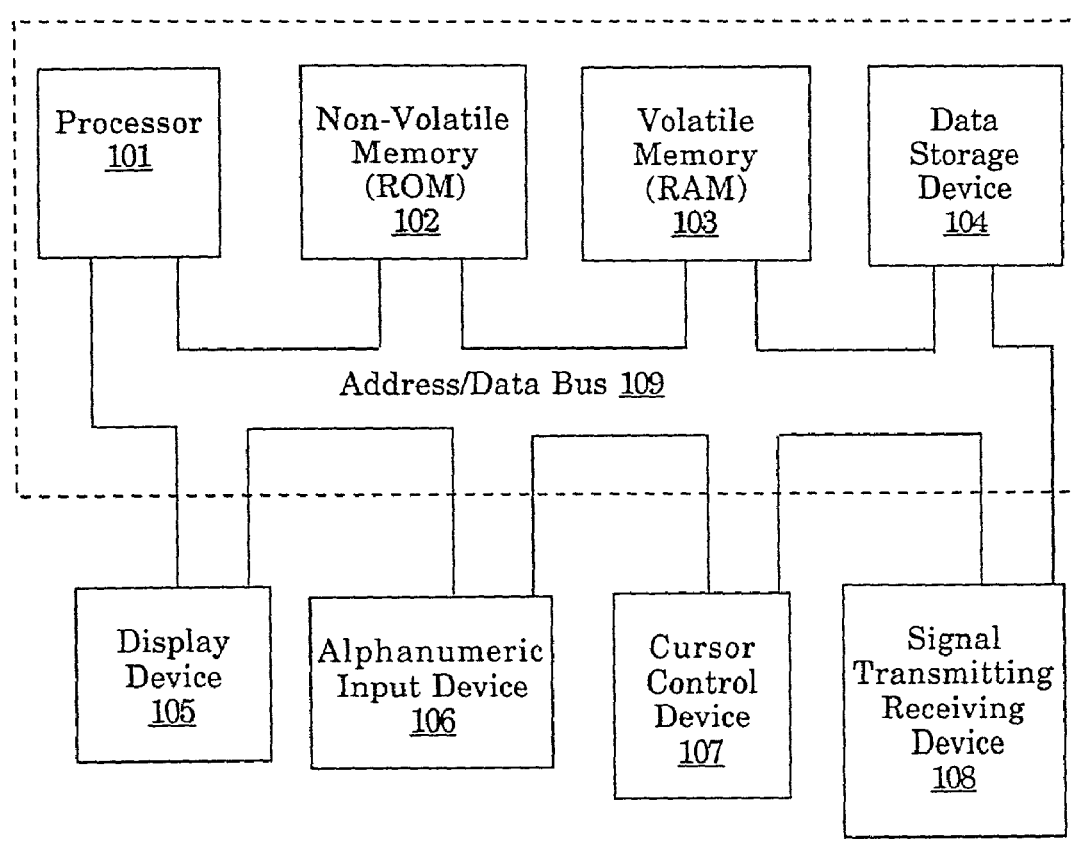
FIG. 1 is a block diagram of an exemplary computer system upon which embodiments of the present invention may be practiced.

A method and system for service management in described. In the following description, for purposes of explanation, numerous specific details are set forth in order to provide a thorough understanding of the present invention. It will be obvious, however, to one skilled in the art that the present invention may be practiced without these specific details. In other instances, well-known and structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art, A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing" or "defining" or "declaring" or "validating" or "notifying" or "performing" or "sending" or "expressing" or "switching" or "enabling" or "providing" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a network of computer systems, e.g., servers, workstation, desktop, and laptop computer systems. However, it is appreciated that the present invention can be used with other types of devices that have the capability to access some type of central device or central site, including but not limited to handheld computer systems, cell phones, pagers, and other electronic devices which are adapted to provide Internet and Intranet access.

It is noted that in the disclosure which follows, the acronym SSMS, and the term Service and Server Management System, which the acronym represents, will be interchangeably used throughout.

Exemplary Electronic System

With reference to FIG. 1, portions of the present invention are comprised of computer-readable and computer executable instructions which reside, for example, in computer-readable media of an electronic system such as a computer system. FIG. 1 illustrates an exemplary electronic device 150 upon which embodiments of the present invention may be practiced. It should be appreciated that electronic device 150 of FIG. 1 is an exemplary representation of a number of different computer systems and electronic devices in which the present invention can operate, including but not limited to desktop computers, e.g., desktop computer 102 of FIG. 2B, laptop computers, e.g., laptop computer 101 of FIG. 2B, handheld computers, e.g., handheld computer 100 of FIG. 2B, cell phones, pagers, etc.

Electronic system 150 includes an address/data bus 109 for communicating information, a processor 101 coupled with bus 109 for processing information and instructions, a non-volatile memory (ROM—read only memory) 102 coupled with bus 109 for storing static information and instructions for processor 101, and a volatile memory (RAM—random access memory) 103 coupled with bus 109 for storing information and instructions for the processor 101. Electronic device 150 also includes data storage device 104 such as a magnetic or optical disk and disk drive coupled with bus 109 for storing information and instructions. Data storage device 104 can include one or more removable magnetic or optical storage media, e.g., diskettes, tapes, SD (secure digital) cards, MMC (multi-media cards), which are computer readable memories. Memory units of electronic device 150 include volatile memory 103, non-volatile memory 102, and data storage device 104.

Electronic device 150 of FIG. 1 can further include an optional signal generating device 108, e.g., a wired or wireless network interface card (NIC) coupled with bus 109 for interfacing with other computer systems and/or other electronic devices. Electronic device 150 can also include an optional alphanumeric input device 106 which includes alphanumeric and function keys coupled with bus 109 for communicating information and command selections to processor 101. An optional display device 105 can be coupled with bus 109 for displaying information to a computer user. Display device 105 may be a liquid crystal display (LCD), a cathode ray tube (CRT), a flat panel display such as an FED (field emission display), an electronic paper display, or nearly any other display device suitable for creating and generating graphic images and alphanumeric characters recognizable to a user.

Electronic device 150 also includes an optional cursor control or directing device 107 coupled with bus 109 for communicating user input information and command selections to processor 101. Cursor control device 107 allows the user to dynamically signal the two dimensional movement of a visible symbol (cursor) on a display screen of display device 105. Many implementations of cursor control device 107 are known in the art, including but not limited to, a trackball, mouse, optical mouse, touch pad, touch screen, joystick, or special keys on alphanumeric input device 106 capable of signaling movement of a given direction or manner of displacement. Alternatively, it is appreciated that a cursor can be directed and/or activated via input from alphanumeric input device 106 using special keys and/or key sequence commands.

Exemplary Network Environment

Figure 2A:
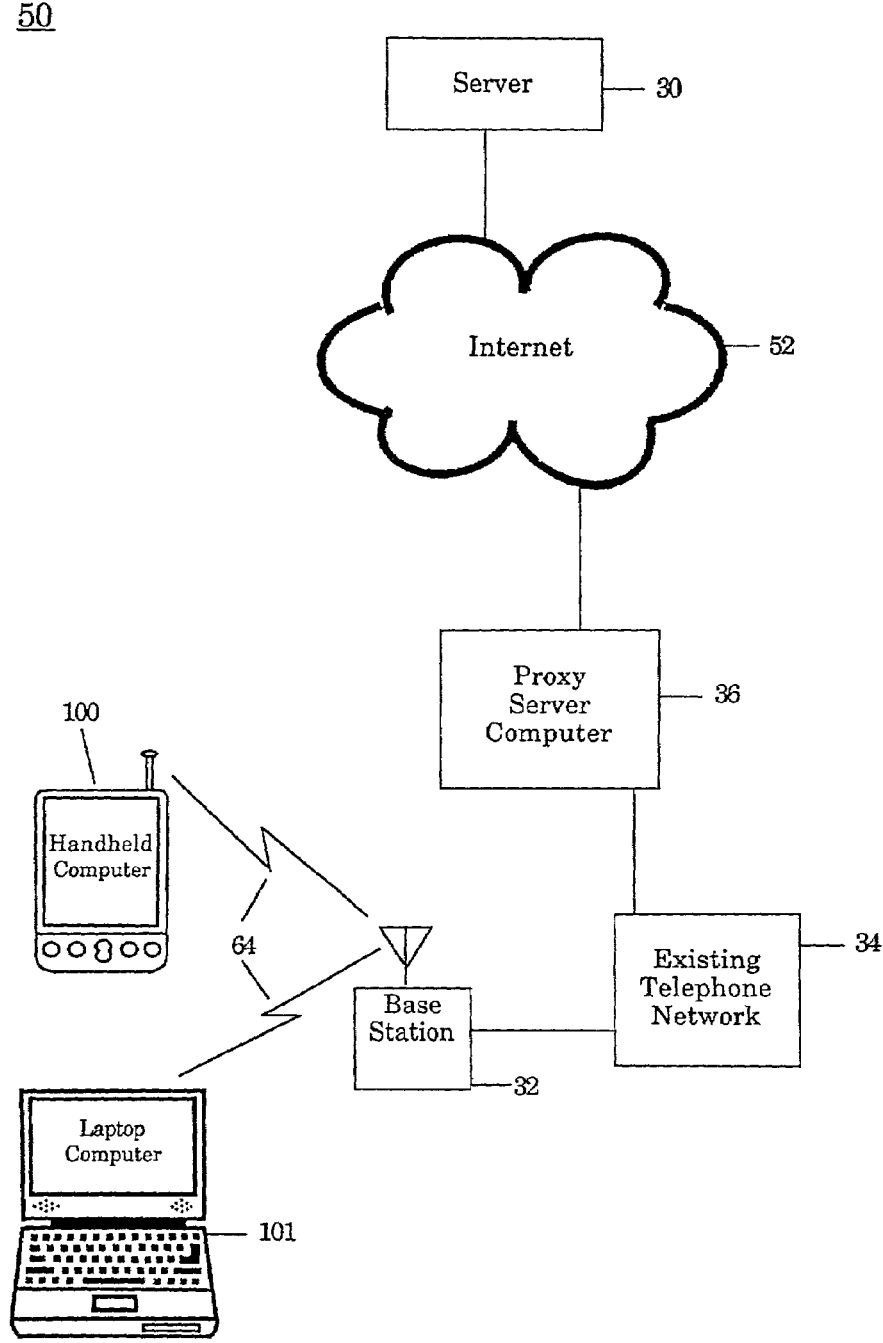
FIG. 2A is a block diagram of an exemplary network environment including a laptop and a handheld computer system upon which embodiments of the present invention may be practiced.

FIG. 2A is a block diagram of an exemplary network environment 50 including a portable/handheld computer system 100 and a laptop computer system 101 upon which embodiments of the present invention may be practiced, in accordance with one embodiment of the present invention. Portable computer system 100 is also known as a palmtop or palm-sized computer system. In one embodiment, portable computer system 100 and laptop computer system 101 have the ability to transmit and receive data and information over a wireless communication interface (e.g., a radio interface), as indicated by line 64. For purposes of the present application, the term "portable computer system" is not intended to be limited solely to conventional palmtop or portable computers. Instead, the term "portable computer" or "portable computer system" is also intended to include nearly any mobile electronic device. Such mobile devices include but are not limited to pagers and paging systems, wireless and cellular telephones, electronic address books, and numerous other mobile devices that may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 and laptop computer system 101 to communicate with a proxy server computer system 36, which is coupled by wire to the existing public telephone network 34. Furthermore, proxy server computer system 36 is coupled to the Internet 52, thereby enabling portable computer system 100 and laptop computer system 101 to communicate with the Internet 52, and to site 30, where, in one embodiment, the present invention, SSMS (Service and server management System) 2001 is disposed. In one embodiment, site 30 can be a Web site. In another embodiment, site 30 can be server. In another embodiment, site 30 may a handheld computer system 100, a laptop computer system 101, a desktop computer system 102, or other electronic device. When communicating with site 30 over Internet 52, protocols such as CTP (Compact Transport Protocol) and CML (Compact Markup Language) and WML (Wireless Markup Language) can be used by portable computer system 100 and laptop computer system 101 in one embodiment. In another embodiment, XML (Extensible Markup Language) is utilized.

It should be appreciated that one of the functions of proxy server 36 is to perform operations over the Internet 52 on behalf of portable computer system 100 and laptop computer system 101. For example, proxy server 36 has a particular Internet address and acts as a proxy device for portable computer system 100 over the Internet 52. It should be further appreciated that other embodiments of a communications network, planned or envisioned, may be utilized in accordance with the present invention. For example, a wireless connection may be made from portable computer system 100 and/or laptop computer system 101 directly to the Internet 52 to access site 30.

The data and information which are communicated between base station 32 and portable computer system 100 and laptop computer system 101 are the same type of information and data that can conventionally be transferred and received over a public telephone wire network system. Additionally, in FIG. 2A, the existing telephone network could also be a packet-based network utilized by some conventional portable computer systems. However, a wireless communication interface is utilized to communicate data and information between portable computer system 100 and base station 32. Furthermore, nearly any wireless network can support the functionality to be disclosed herein. It is appreciated that in one embodiment, a desktop computer system 102 (FIG. 2B) can be implemented analogous to the implementation of portable computer system 100 and laptop computer system 101 as described above, provided desktop computer system 102 is analogously equipped.

Figure 2B:
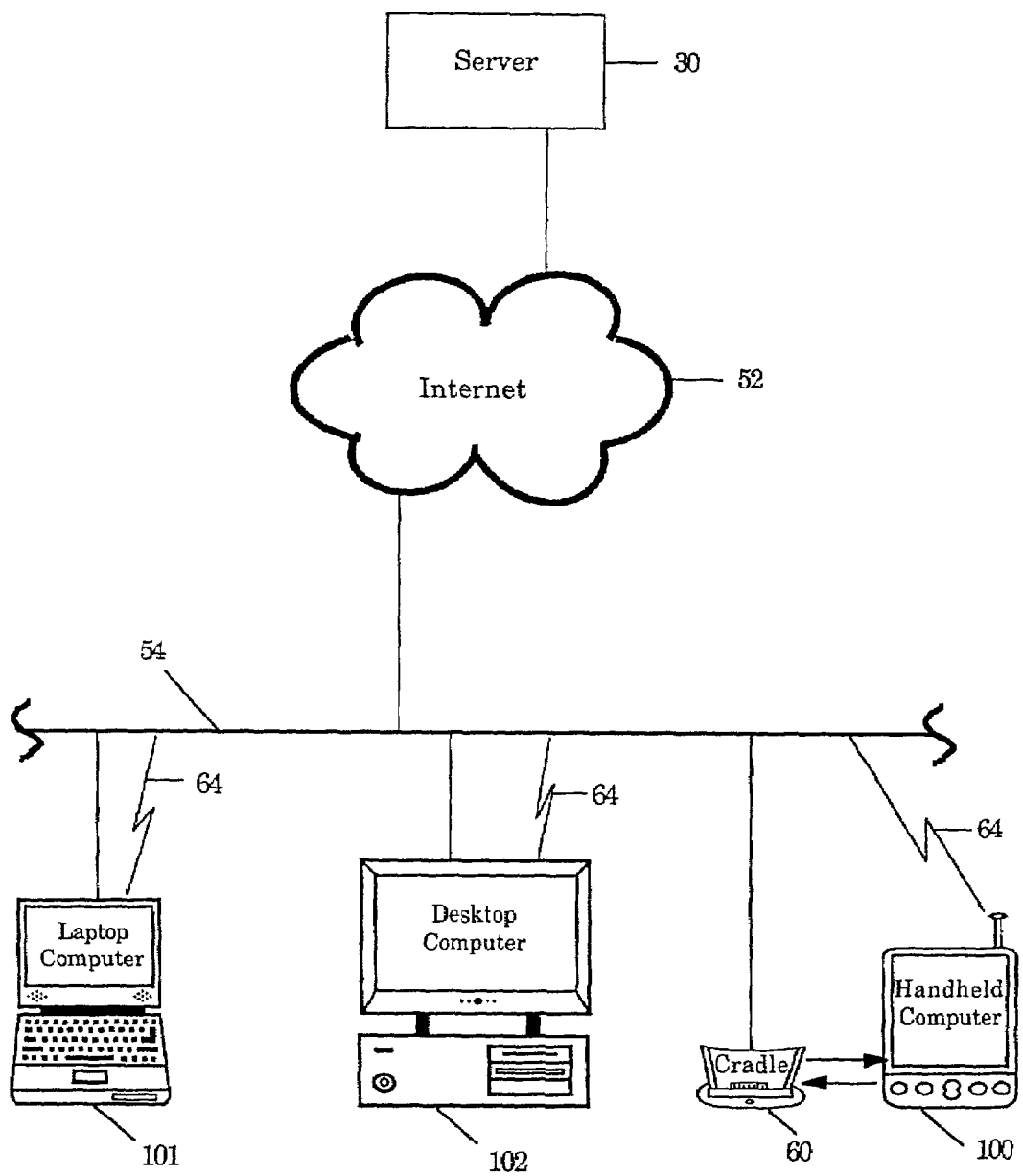
FIG. 2B is a block diagram of a desktop, laptop, and handheld computer system connected to each other and the Internet in a network environment and upon which embodiments of the present invention may be practiced.

FIG. 2B illustrates another embodiment of a system 51 that can be used in conjunction with various embodiments of the present invention. System 51 comprises a host computer system 56 that can either be a desktop unit 102 or alternatively, a laptop system 101. Optionally, one or more host computer systems can be used within system 51. Host computer systems 102 and 101 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 and to site 30 using a number of well-known protocols.

Importantly, bus 54 may also be coupled to a cradle 60 for receiving and initiating communication with portable computer system 100. Cradle 60 provides an electrical and mechanical communication interface between bus 54 (and anything coupled to bus 54) and the computer system 100 for two-way communications. Portable computer system 100 may instead be coupled to host computer systems 101 and 102 via a wireless (radio) connection. Portable computer system 100 also contains a wireless infrared communication mechanism 64 for sending and receiving information from other devices. Additionally, in FIG. 2B, the existing telephone network could also be a packet-based network utilized by some conventional portable computer systems.

With reference to both FIGS. 2A and 2B, it is appreciated that portable computer system 100, laptop computer system 101, and desktop computer system 102 can be used in a network environment combining elements of networks 50 and 51. That is, computer systems 100, 101, and 102 can include both a wireless infrared communication mechanism and a signal (e.g., radio) receiver/transmitter device.

Figure 2C:
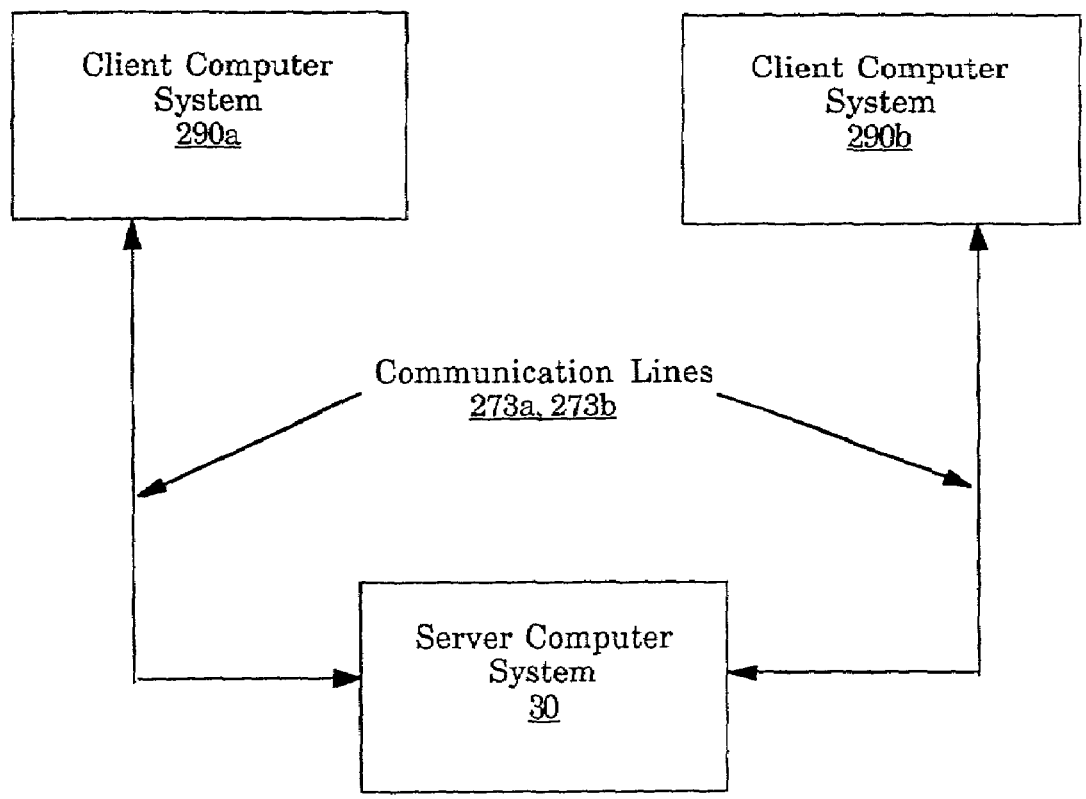
FIG. 2C is a block diagram of a client/server network environment upon which embodiments of the present invention may be practiced.

FIG. 2C is a block diagram illustrating an exemplary client-server computer system network 250 upon which embodiments of the present invention may be practiced. Network 250 may be a communication network located within a firewall of an organization or corporation (an "Intranet"), or network 250 may represent a portion of the World Wide Web or Internet. Client (or user) computer systems 290a and 290b and server computer system 30 are communicatively coupled via communication lines 273a and 273b; the mechanisms for communicatively coupling computer systems over the Internet or over Intranets are well-known in the art.

It should be appreciated that electronic system 150 of FIG. 1 can be implemented as a client computer systems, e.g., client computer system 290a or 290b of FIG. 2C or electronic system 150 can be implemented a server computer system 30, of FIGS. 2A, 2B, and 2C. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode).

Alternatively, client computer systems 290a and 290b can be coupled to server computer 30 via an input/output port (e.g., a serial port) of server computer system 30; that is, client computer systems 290a and 290b and server computer system 30 may be non-networked devices. Though network 250 of FIG. 2C is shown to include one server computer system 30 and two client computer systems, 290a and 290b, respectively, it is appreciated that more than one server computer system 30 and more than two client computer systems can be used.

It is further appreciated that, in one embodiment, client computer systems 290a and 290b and server computer 30 are configured with SSMS (Service and server management System) 2001. It is appreciated that SSMS is well suited to interact with nearly any number of servers. In another embodiment, client computer 290a may be enabled to directly communicate with client computer 290b, without utilizing server 30.

Service and Server Management System

It is noted that in the context of the disclosure to follow, the term service or services can represent servers, services, and/or applications, and as such will be used interchangeably throughout.

SSMS (service and server management system) provides a concise set of easy to use interfaces that perform search, read, and modify operations regarding configuration information and parameters. Administrators, and/or permitted users, of the system can define data validation rules, commonly referred to as schema. SSMS also enables services, e.g. servers and/or applications, to define schema and how data will be represented. The interfaces provided are independent, such that different interfaces are generated relative to the administrator and the configuration information accessed. For example, for one set of schema (one type of data) access can be through a web page. For another set of schema, access can be via a CLI (command line interface). Accordingly, because the interface is relative to the user and the data, an administrator can access SSMS 2001 to change configuration information via cell phones, handheld computers (PDAs), or other electronic devices configured to access a server.

Also provided by SSMS, in one embodiment, is the ability to validate modifications to configuration data to comply with the defined schema. When modification of the configuration information occurs, the modification operation of the SSMS checks the validity of the information before writing the information to the data store. A validator, e.g., validator 505, enabled to interface with the schema, compares the modification with the defined schema, and if the modification complies with the schema, the modification is accepted, otherwise an error message is relayed to the administrator. In one embodiment, the modification is validated during modification, therefore ensuring compliance with the schema which had previously defined the data being modified.

Further, SSMS provides, in one embodiment, enablement of the services to register notification requests so as to be apprised of changes performed elsewhere within the network by other instances of SSMS. In accordance with the notification registration, a listener, e.g., listener 501 of FIG. 5, interfacing with a parser, provides notification of modifications to the services that are directly or indirectly affected by a change in data.

SSMS further provides easy representation of data, such that no loss of generality occurs. Configuration data, in accordance with one embodiment of the present invention, is expressed in XML (extensible markup language). In comparison to the custom format as described in the background, XML is a uniform language. By utilizing a uniform language, e.g., XML, or a derivative thereof, to represent the data, SSMS nearly eliminates conflicts in data format, overlapping of data formats, and provides easy adaptation of new data types. Additionally, XML provides for the best scaleablility. In one embodiment, SSMS utilizes XML (extensible markup language) to store the data on the server side of the system. It is appreciated that in other embodiments, alternate markup languages, e.g., HTML, can be used alone or in conjunction with the XML used by SSMS.

SSMS also provides security and which allows administrators to specify access rights. As with most network environments, permissions are implemented to control access to the configuration information. In one embodiment, SSMS requires that for nearly any operation or task to be performed, the administrator and/or authorized user is usually required to first identify oneself. In one embodiment, each administrator/user receives a token after successfully logging-in to the system. In Java, a programming language implemented in SSMS, the token is called the principal. SSMS mandates that a valid SSOtoken (single sign on token, a derivative of principal) be presented for an operation to be performed.

Additionally provided by SSMS, in one embodiment, is the ability to access the data from anywhere in the network, while not compromising security. By virtue of above described access controls implemented in combination with the utilization of XML to represent data, the data can be presented in a manner that is useable and understandable in nearly any device adapted to access a server or the Internet or an Intranet. For example, an administrator can, as anticipated, access SSMS from a server computer, a workstation computer, a desktop computer, and/or a laptop computer. In addition, because of the adaptability of XML, an administrator can access SSMS from a handheld computer or other electronic device adapted to access a server or the Internet.

SSMS, in one embodiment, further provides high value solutions, e.g., easy adaptation and configurability for utilization with other types of services and applications that may be currently being developed or considered, e.g., new email service protocols, new operating systems, new network protocols, and the like.

Further, SSMS utilizes a computer system's cache to store the configuration data that will be changed or checked. For example, when an administrator accesses information, stored in a server within the network, SSMS loads that data into the cache of the computer from which access to SSMS was initiated. By utilizing the initiating computer to store data being checked or modified, SSMS all but eliminates instances of excessive loads being placed on system memory in connection with duplicate data being stored throughout the network system.

The SSMS provides the ability to read and write configuration data. Nearly all server systems are required to store various types of configuration data and need to be able to read the data at some time. The SSMS is enabled to read the various types of data that is inputted by an administrator or permitted user. In one embodiment, SSMS utilizes XML (extensible markup language) to store the data on the server side of the system. It is appreciated that in other embodiments, alternative markup languages, e.g., HTML, can be used alone or in conjunction with the XML used by SSMS.

Figure 5:
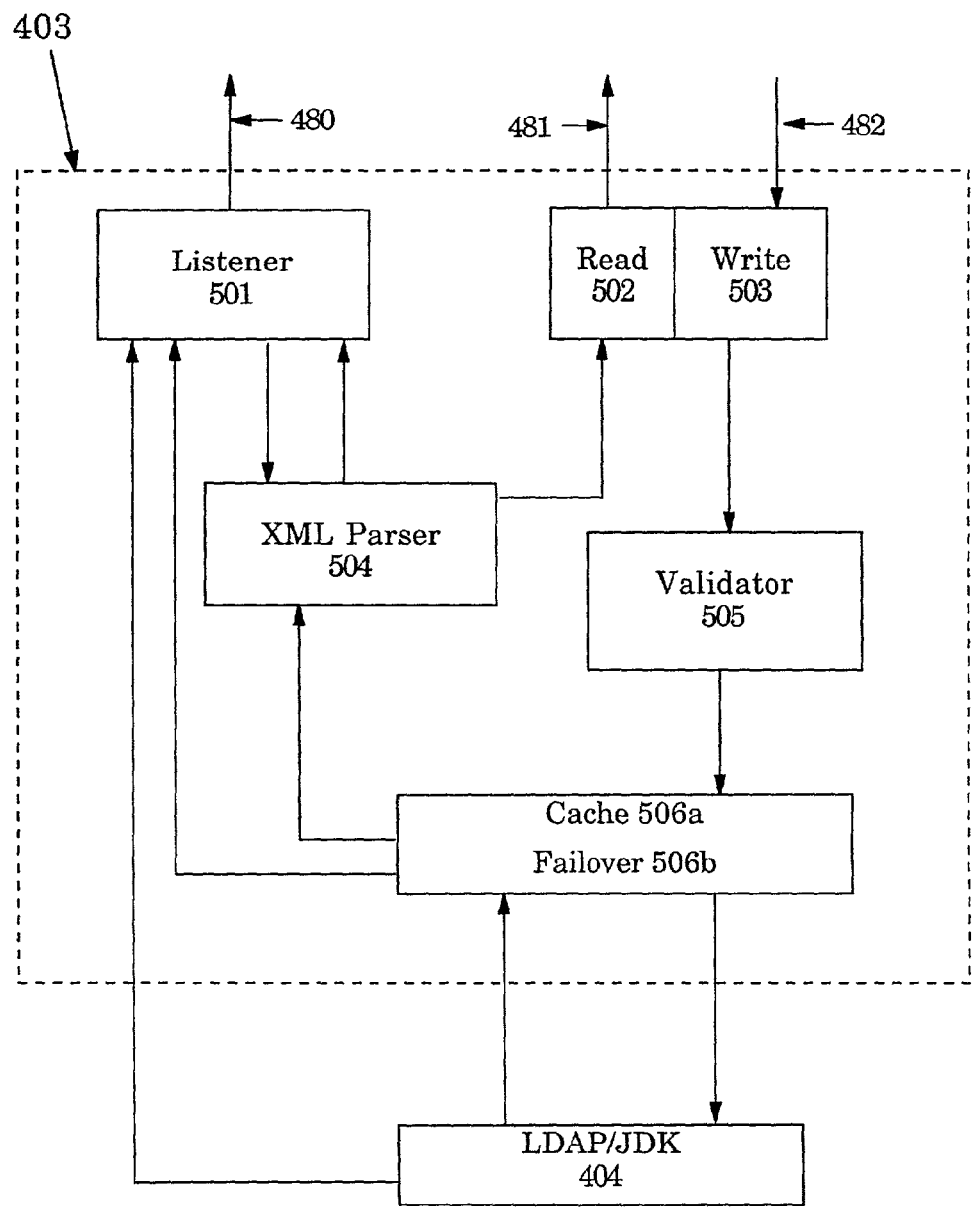
FIG. 5 is block diagram detailing internal components of a service and service management system, in accordance with one embodiment of the present invention.

The above features further enable SSMS to perform, in one embodiment, additional functions such as data store failover (as described in FIG. 5). For example, if during an access of data, the server from which the data is being accessed fails, SSMS automatically switches to a server or location where additional analogous data is stored.

Also provided by SSMS, in one embodiment, is the ability to utilize a template for multiple implementations. For example, a company may have numerous servers, and a template driven interface is used to access the services provided by those numerous servers. It is appreciated that the template is designed for that particular instance. SSMS provides for easy adaptation of that template for alternate local uses by other servers and services.

SSMS also provides a mechanism by which services can dynamically determine if and when plugins are being added to their configuration. Services are notified, also through the registration notification request process, as described above, when plugins are added to their system. SSMS forwards a mechanism to the service, enabling the service to receive the particular plugin over the network. It is appreciated that other services that required the plugin are also enabled to concurrently receive the plugin.

SSMS Architecture

The SSMS provides interfaces for server and service developers and administrators to define and manage servers and services, with respect to configuration parameters and execution of tasks. Tasks are server and service specific. For example, an IDs task, e.g., to backup the directory server, or an is task, e.g., to restart the web server, and so on.

In one embodiment, SSMS provides an interface for server and service developers to define and describe server and service tasks, configuration parameters and policy privileges. In one embodiment, the interface is an XML (DTD (Document Type Definition)) interface.

In one embodiment, SSMS provides an interface for server and service developers to read (obtain) its configuration parameters. In one embodiment, the interface is a Java interface.

In one embodiment, SSMS provides an interface for administrators, via a GUI or a CLI (graphical user interface or command line interface, respectively), to manage servers and services, e.g., execution of tasks and add/set/modify/delete configuration parameters. In one embodiment, the interface is a Java interface (SDK (software development kit)).

In one embodiment, SSMS provides an LDAP (lightweight directory access protocol) DIT (directory information tree) and schema that are used to represent server and service configuration data and tasks.

It is appreciated that in order to effectively provide the above listed interfaces, SSMS defines, in one embodiment, three kinds of information that are required from the server and service developers and administrators.

The first kind of required information, in one embodiment, are the tasks. The server and service developers must define the various kinds of tasks that can performed on the server or service. For example, tasks that can be performed on the server or service can include, but are not limited to, start, stop, restart, and changePortNumber.

The second kind of required information, in one embodiment, is the schema. The server and service developers must define the schema for various configuration parameters that can be managed (add/delete/modify) by the administrator. For example, parameters that can be managed can include, but are not limited to, port number, cache size, and modem speed. The schema for these configuration parameters would specify if these parameters are strings, numbers, or Boolean, etc., and if are multivalued, single valued, or one of the choice values, e.g., if, then, when, and so on;

The third kind of required information, in one embodiment, is the configuration. The configuration information describes the data for the configuration parameters, as described above. Administrators (either during or after installation of the product) can optionally specify the data for these configuration parameters. Servers and services can also get/add/modify/delete the configuration data. For example, data being specified can include, but is not limited to, specifying the port number to be 80, specifying the cache size to be 2 MB, and specifying the modem speed to be 56 Kbps.

Figure 3:
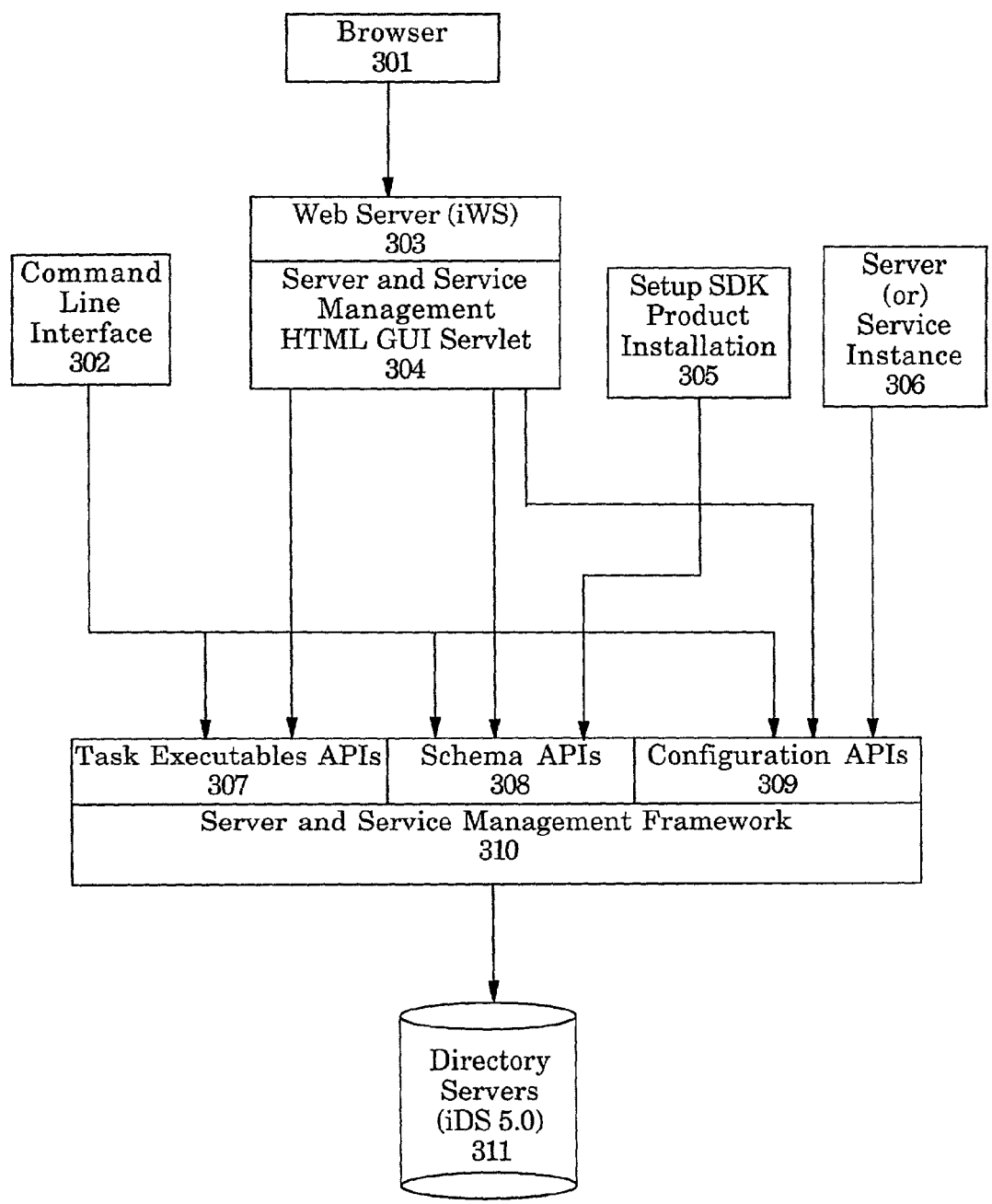
FIG. 3 is a block diagram of the general architecture of a server management service, in accordance with one embodiment of present invention.

FIG. 3 shows, in one embodiment, the general architecture for service and server management, as provided by SSMS. Browser 301 represents the access point to web server 303, from which access to SSMS is granted. As shown in FIG. 3, service and server management system 2001 provides a framework 310 and exposes Java interfaces, e.g., task executable API 307, schema API 308, and configuration API 309, for task execution, schema and configuration management.

Also shown in FIG. 3 are consumers of these interfaces, e.g., command line interface 302, service and server management HTML graphical user interface servlet 304, setup SDK product installation 305, and service/service instance 306. The life-cycle of service and server management starts with the registration of the server or service via the schema management interfaces 308. The server or service's tasks, schema and configuration are registered using a XML file. In one embodiment, this is accomplished during installation of the product using Setup SDK 305. It is appreciated that during installation, some of the parameters can be configured. Once the service is registered with its tasks and configuration schema, administrators can execute server or service tasks and manage its configuration data using either the command line interfaces (CLIs) 302 or a web browser 301. Server or Service instance 306 can obtain its configuration data using the configuration APIs 309. It is appreciated that the configuration data is in a data store located in directory server 311, in one embodiment of the present invention.

Figure 4:
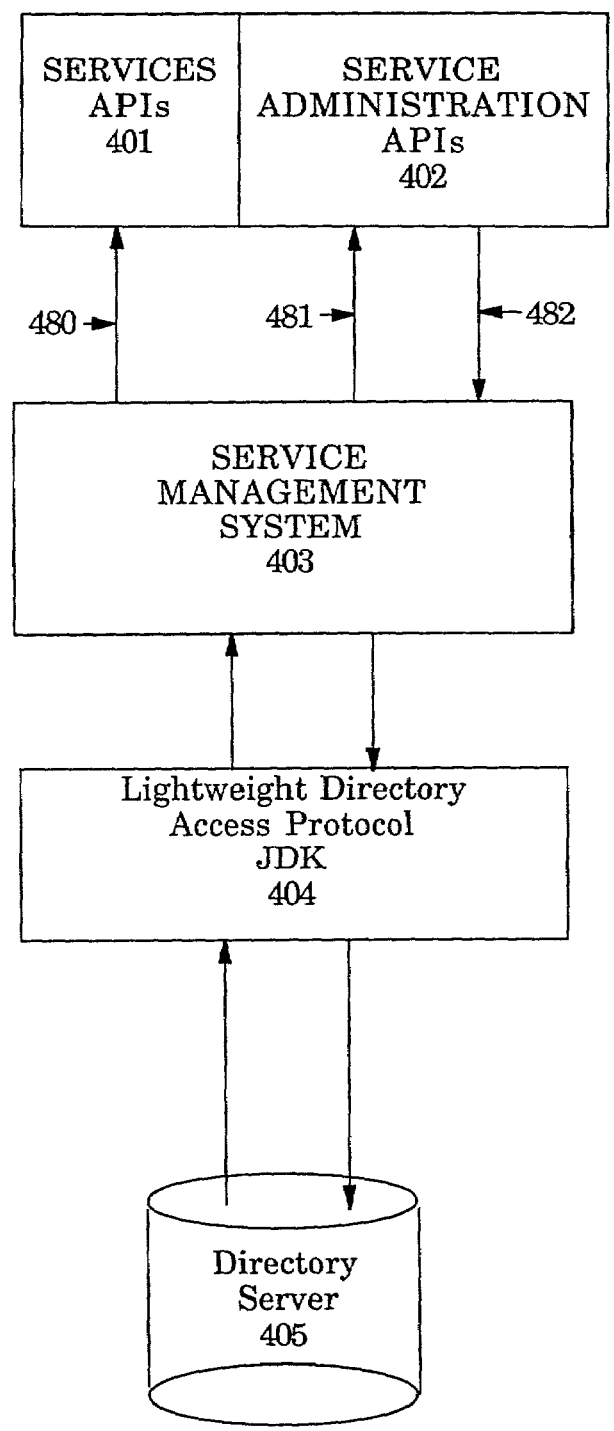
FIG. 4 is block diagram depicting a division of interfaces as viewed from a user perspective, in accordance with one embodiment of the present invention.

FIG. 4 is a block diagram of the division of the APIs provided by SSMS, in one embodiment, from the perspective of the administrator. Services 401, as stated above, represents a configuration, a service, and/or a server. For example, an application can show a configuration, a service can show how to control a configuration, and a server can control a configuration. Accordingly, these terms are very interchangeable, so the term services can mean all three terms, application, service, and server.

Referring still to FIG. 4, services API 401 is, in one embodiment, used to read configuration information via read line 480. Service administration APIs 402 are used, in one embodiment, to modify the configuration information. For example, if an administrator is to change some configuration information, the administrator would put forth their respective privilege (login), and then request, via write line 482, the configuration information that is to be changed by service administrator API 402. Service admin API 402 retrieves the requested configuration information and relays this data to the administrator via read line 481. The administrator enters the new configuration information, via service administrator APIs 402, to service management system 403, a portion of SSMS, which then performs the modification of the configuration information. In this example, the configuration information is in a data store located in directory server 405. LDAP (lightweight directory access protocol JDK (Java developer kit) is the SDK (software development kit) provided by directory server 405. It is appreciated that the components and processes performed within service management system 403 are described in detail in FIG. 5.

FIG. 5 is a block diagram of the components in SSMS 403, a portion of SSMS, in one embodiment of the present invention. When an administrator wants to change some configuration data, after logging-in and being granted access, the data to be changed, is retrieved from a server, e.g., directory server 405 of FIG. 4, via LDAP/JDK 404, and stored in cache 506b. It is appreciated that by storing the configuration information to be changed in cache 506b, this provides an elimination of duplicate configuration information being stored in other servers cache memories.

The cached configuration information is parsed by XML parser 504 and relayed to the administrator via read 502 to read line 481 (also in FIG. 4). The administrator then enters the new configuration information via write line 482 to write 503. The new configuration information is validated by validator 505. Validator 505 checks and validates each and every change in configuration information against the schema the administrator provided earlier. It is appreciated that validator 505 interfaces with the schema to perform the validation. If the configuration information entered by the administrator is in error, the administrator would receive an error message. This indicates that there is a problem with the data being entered, e.g., schema integrity is not met, so the administrator needs to recheck the newly entered data. In one example, the error can be from an incorrectly called API. In another example, it can be a command line interface which returns an error message stating that the data entered does not conform with the constraints that have been specified in the schema. During entering of new data, if an administrator does not receive an error message, this is indicative that the new configuration information complies with the schema of the data being modified.

It is appreciated that validation of data is performed during the writing of new data. When the configuration information is being read, because the validation was performed during the writing process, the administrator is assured that the data relayed to the administrator is valid. It is also appreciated that this process of validation all but eliminates incorrectly entered information, which can cause server failure during reboot, thus reducing troubleshooting, thereby saving administrator's time and a company's money.

Still referring to FIG. 5, failover program 506b provides, in one embodiment, an inherent switching of data store location in the event of a server failure, e.g., directory server 405 of FIG. 4. If, for example, directory server 405 of FIG. 4 goes down, the decentralization provided by SSMS is activated by failover program 506b. Decentralization is a distribution of data process for the servers existing within the network. Failover program 506b attempts to check from which alternate server (decentralized) the data is accessible, going from one server to the next until a server containing the data is located. Accordingly, when a directory server goes down, e.g., directory server 405 of FIG. 4, failover program 506b controls the automatic switching of the services performed by the non-functioning server to one that is functioning properly.

FIG. 5 also shows XML parser 504 which is the data. Once the configuration information is retrieved from a data store, e.g., directory server 405, it is necessary to comprehend the data, and accordingly, XML parser 504 presents the data in a desired manner so as to be easily understood by the administrator.

Also shown in FIG. 5 is listener 501. Listener 501, in one embodiment, performs the notification of the change in configuration information. For example, if there is a change in the configuration information, listener 501 receives a notification from LDAP/JDK 404. Listener 501 then references to XML parser 504 to understand the change in data. Listener 501 then provides meaningful data to the services which can be directly or indirectly affected by the change in data.

Further, some of the services are informed that there are similar or counterparts for the server settings elsewhere in the system that can effect change of the data during run time. Accordingly, those services need to be informed of changes in data. Using SSMS APIs for setting up the notifications, the APIs contact the services to inform them that whenever configuration information changes, listener 501 will initiate an API to inform the servers/services of changes in data.

Schema Management

SSMS schema management component provides, in one embodiment a mechanism for servers and services to define and manage their configuration data. From the perspective of the life cycle of service development and deployment, it is during the development stage that configuration parameters get defined, and it is during the deployment that these parameters get configured. Using the implementation of a mail service, for example, it is during its development that configuration parameters such as cache size, mail quota, mail servers, etc., are defined. Then, during deployment, administrators and/or users configure these parameters.

Services commonly have different kinds of configuration parameters. For example, certain parameters are applicable to service instances (like cache size), and some are applicable to users (like mail quota). Furthermore, these different kinds of configuration parameters would have to be stored and managed differently and, quite possibly, each would have different access control mechanisms. Because of this, SSMS, in one embodiment, provides the following classifications for applying and differentiating control parameter definitions.

One of the classifications for applying and differentiating control parameter definitions are global parameters. Global parameters are common across all (or groups) server and service instances. Changes to these parameters would affect the entire service. An example of a global parameter can be a plugin that is added to the service, or, in another example, a security algorithm that must be used by all servers.

Another of the classifications for applying and differentiating control parameter definitions are instance parameters. Instance parameters are specific to an instance of the server or service. Changes to these parameters would affect only the specific instance. An example of an instance parameter can be the cache size and, in another example, the maximum number of threads.

Another of the classifications for applying and differentiating control parameter definitions are organization parameters. Organization parameters can be configured differently for various organization. Changes to these parameters would affect only the organization. An example of an organization parameter can be the mail servers used by an organization.

Another of the classifications for applying and differentiating control parameter definitions are dynamic parameters. Dynamic parameters apply to all user objects. Changes made to these configuration parameters affects all user objects. An example of a dynamic parameter can be an organization's address.

Another of the classifications for applying and differentiating control parameter definitions are user parameters. User parameters are user specific. Changes to these parameters would affect the specific user. An example of a user parameter can be a user's home address and telephone number.

Another of the classifications for applying and differentiating control parameter definitions are policy parameters. Policy parameters define the privileges provided by the service. An example of a policy parameter can be a web server defining the URL access privileges.

As described above, server and service developers would have to define their configuration parameters at the time of development. SSMS provides, in one embodiment, a mechanism for server and service developers to define their configuration parameters and optionally provide default values. The mechanism is through an XML file that should adhere to the DTD (data type definition) as described below in the section relating to server and service registration DTD.

The definition of the configuration parameters via the XML file is called the schema for the service.

Although the SSMS schema management component provides support for storing and managing the configuration schema, it is appreciated that it manages configuration data only for global, instance and organization types.

User and dynamic configuration data is managed by the user management component and policy configuration is managed by the policy management component. It is appreciated that user, dynamic and policy management rely on service management for service schema management.

Service and Server Configuration Schema

The service configuration schema and the server configuration schema are stored in a directory server, e.g., directory server 405 of FIG. 4. Servers and services that require their configuration information to be managed via the interfaces provided by SSMS SDK (software development kit) and Administration GUI (and CLI) need to organize such information using the DTD (data type definition) which is defined below.

The configuration information for a service is, in one embodiment, being modeled as a tree structure with the root node being the service name. Each node in the tree could have any number of attributes and sub nodes. The structure of the tree is defined by the DTD. Since most of the services use client-server and plugin architecture, the configuration DTD provides explicit support for managing service URLs and plugin objects respectively. It is appreciated that the service URLs can be configured only at the root node. However, it is further appreciated that plugin objects can be configured for any node within the tree.

In one embodiment, the root element for the XML document is defined as Product Configuration in order to support multiple server and service definitions within a single XML file. Within the root node are the elements for an individual server or service and are defined by Product elements. Each Product element has an attribute called name that gives the product's name, and another attribute called version to specify the its version number. The SSMS configuration schema and configuration data are defined within the Product elements.

The schema for a server or service is defined using the element named Schema. The schema element has, in one embodiment, the following attributes to help SSMS interfaces in internationalization (I18N).

One attribute to help SSMS is i18nJarURL. i18nJarURL specifies the URL of the jar (Java archive) file that contains the resource bundle, e.g., the I18N properties file.

Another attribute to help SSMS is i18nFileName. i18nFileName specifies the resource bundle name i.e., the I18N properties file name.

Another attribute to help SSMS is i18nKey. i18nKey specifies the key that must be used to obtain the description for the server or service in a given locale. It is appreciated that this attribute is used by most of the XML element to obtain its description.

As mentioned above, the configuration information is modeled as a tree structure with sub-nodes, and hence services can group the configuration parameters as required using these sub-nodes within the Schema element. However, it is appreciated that at the top level, these sub-nodes are limited to the general classification as discussed above, which are; Global, Instance, Organization, Dynamic, Policy and User. However, of the nodes Global, Instance and Organization, each can have any number of SubSchema elements.

In one embodiment, the elements and Global, Instance, Organization, Dynamic, Policy, User and SubSchema can define a list of configurable parameters (attributes) for the respective node using the element AttributeSchema. However, Global, Instance, Organization, and SubSchema can have the following additional sub-elements (or sub-nodes).

One example of a sub-element is Plugininterface. Plugininterface specifies the plugin interfaces that is used by the service. Plugin modules can be developed to these interfaces and can be dynamically added to the server or service. The Plugininterface element has, in one embodiment, its own attributes. One attribute is name, which is used to identify the name of the plugin interface. Another attribute is interface, which provides a fully qualified Java interface name. Another attribute is i18nKey, which gives the I18N index key that describes the plugin interface for a given locale.

Another example of a sub-element is AttributeSchema. AttributeSchema specifies a list of configuration parameters used by the service. These are the parameters that can be configured by the administrators and/or users.

Another example of a sub-element is SubSchema. SubSchema specifies subordinate schema nodes. The element SubSchema has, in one embodiment, additional attributes to provide information of the sub-node. One of the additional attributes related to SubSchema is name. Name specifies the name for the sub schema node (e.g., groups of parameters). Another SubSchema additional attribute is inheritance. Inheritance specifies whether this schema can by inherited by only one or multiple configuration nodes.

Possible values for the inheritance attribute are either single or multiple. In one embodiment, the default is single. An example of single inheritance would be service configuration information like cache size, maximum number of threads, etc. In this example, there could be only one configuration node defining this data as peers. An example of multiple inheritance would be a service's user attributes (like mail quota, mail server, etc.) that could be implemented as COS (class of service) definitions which is defined once, but would have multiple configuration nodes that could be implemented as multiple COS templates.

Another example of an additional attribute of SubSchema is maintainPriority. MaintainPriority specifies whether order must be maintained among the peer nodes.

Another example of an additional attribute of SubSchema is i18nKey. i18nKey gives the I18N index key which describes the service sub schema for a given locale.

The following is an example of authentication service using ServiceSchema and Organization, which uses URLs, and plugins. It is appreciated that the configuration parameters used in the following example are exemplary only, and as such, do not reflect iDSAME's (iPlanet directory server access management edition) parameters.

```
<ProductConfiguration>
    <Product name="authentication">
        <Schema i18nJarURL="file:/opt/dpro/lib/auth.jar"
        i18nFileName="authentication"
        i18nKey="com.iplanet.authentication.name">
            <Organization>
                <PluginInterface name="loginModule"
                interface="javax.security.auth.spi.LoginModule"
                i18nKey="com.iplanet.authentication.login
                    ModuleInterface" />
            </Organization>
        </Schema>
    </Product>
</ProductConfiguration>
```

The element AttributeSchema, in one embodiment, defines the schema of a configuration parameter. Using the AttributeSchema element, services can define the XML schema of their configuration parameters by having multiple AttributeSchema element. The service registration DTD (data type definition), in one embodiment, provides a number of attributes to describe the schema for the attribute.

One example of an AttributeSchema attribute is name. Name specifies the name for the attribute, (e.g., mailQuota). Another example of an attribute of AttributeSchema is type. Type specifies the format of values that this attribute can have. Table One, below, contains, in one embodiment, a list of supported format values within the type attribute as it relates to the element AttributeSchema. It is appreciated that the contents of Table One is exemplary in nature, and as such, should not be considered exhaustive.

TABLE ONE

| | |
|---|---|
| Single | Specifies that the attribute can have only a single value. |
| List | Specifies that the attribute can have multiple values. |
| Single_choice | Specifies that the attribute can have a single that must be selected from a choice list. |
| Multiple_choice | Specifies that the attribute can have multiple values but must be selected from choice list. In one embodiment, the default is list. |
| Syntax | Specifies the syntax of the attribute value. Examples of supported syntax can include, but are not limited to: Boolean, string, numeric, dn, password, email, url, percent, number, decimal_number, number_range and decimal_range. |
| RangeStart | Specifies starting number or decimal for number_range or decimal_range respectively. |
| RangeEnd | Specifies ending number or decimal for number_range or decimal_range respectively. |
| Any | Specifies a wildcard that can used by services to declare additional configuration information. |
| i18nKey | Gives the I18N index key that describes the attribute for a given locale. In the absence of this attribute, the name attribute will be used as the I18N key to index into the resource bundle. For the choice values, the I18N key will be constructed by suffixing the i18nKey with "." and then the choice value. |
| IsOptional | Specifies if the configuration parameter is optional. |
| IsServiceIdentifier | Specifies if the parameter will be used to identify the type of service offered (analogous to COS (class of service) specifier). |
| IsStatusAttribute | Specifies if the parameter is the status attribute for the service. |
| DefaultValues | Provides the default values for the configuration parameter. |
| ChoiceValues | Provides the possible choice values for the configuration parameter if its type is either single_choice or multiple_choice. |

Although the schema for all the attributes can, in one embodiment, be defined, it is quite possible that, in another embodiment, some of configuration parameters are valid only when another configuration parameter has a specific value. For example, the logging service has, in one embodiment, backend, filename, and db Server as configuration parameters.

The configuration parameter backend of the logging service specifies the kind of repository to be used for storing logs. In one embodiment, values for backend can be, but are not limited to "FILES" or "JDBC (Java database connectivity)." If the "FILES" is chosen, then the configuration parameter filename is valid. However, if "JDBC" is chosen, then the configuration parameter dbServer is valid. To support such conditional parameters, iDSAME (iPlanet directory server access management edition) service registration DTD defines the Condition element which could be defined with the Attribute Schema element. The Condition element has an element AttributeValuePair and an attribute operator. The element attributeValuePair provides the name of the attribute and its value, and the operator attribute specifies a Boolean operation ("equals" or "notEquals" ) for which the conditional attribute is valid.

The following is an example of a log service, which defines its organization and conditional configuration parameters. It is appreciated that configuration parameters used here are exemplary only, and it does not reflect iDSAME's (iPlanet Directory Server Access Management Edition) parameters.

```
<ProductConfiguration>
<Product name="log">
    <Schema i18nJarURL="file:/opt/dpro/lib/log.jar"
        i18nFileName="log"
        i18nKey="com.iplanet.log.name">
        <Organization>
            <SubSchema name="application"
                inheritance="multiple"
                i18nKey="com.iplanet.log.applications">
                <AttributeSchema name= "loglevel"
                    type="choice" cardinality="single">
                    <ChoiceValues>
                        <Value>OFF</Value>
                        <Value>INFO</Value>
                        <Value>WARNING</Value>
                        <Value>SEVERE</Value>
                    </ChoiceValues>
                    <DefaultValues>
                        <Value>OFF</Value>
                    </DefaultValues>
                </AttributeSchema>
                <AttributeSchema name="backend"
                    type="choice" cardinality="single">
                    <ChoiceValues>
                        <Value>FILES</Value>
                        <Value>JDBC</Value>
                    </ChoiceValues>
                    <DefaultValues>
                        <Value>FILES</Value>
                    </DefaultValues>
                </AttributeSchema>
                <AttributeSchema name="filename"
                    type="text" cardinality="single"
                    default="log.txt">
                    <Condition>
                        <AttributeValuePair>
                            <Attribute
                                name="backend"/>
                            <Value>
                                FILES</Value>
                        </AttributeValuePair>
                    </Condition>
                </AttributeSchema>
                <AttributeSchema name="dbServer"
                    type="text"
                    cardinality="single">
                    <Condition>
                        <AttributeValuePair>
                            <Attribute
                                name="backend"/>
                            <Value>
                                JDBC</Value>
                        </AttributeValuePair>
                    </Condition>
                </AttributeSchema>
            </SubSchema>
        </Organization>
    </Schema>
</Product>
</ProductConfiguration>
```

The following is an example of mail service, which defines its dynamic configuration parameters. It is appreciated that the configuration parameters shown below are exemplary, and do not reflect iDSAME (iPlanet directory server access management edition) parameters.

```
<ProductConfiguration>
    <Product name="Mail">
        <Schema i18nJarURL="file:/opt/dpro/lib/mail.jar"
            i18nFileName="mail"
            i18nKey="com.iplanet.mail.name">
            <Dynamic>
                <AttributeSchema name= "mailStatus"
```

-continued

```
                    cardinality="single" displayType="list" >
                    <ChoiceValues>
                        <Value>active</Value>
                        <Value>inactive</Value>
                    </ChoiceValues>
                    <IsStatusAttribute/>
                    <DefaultValues>
                        <Value>active</Value>
                    </DefaultValues>
                </AttributeSchema>
                <AttributeSchema name="mailQuota"
                    cardinality="single" syntax="numeric"/>
                <AttributeSchema name="mailLevel"
                    cardinality="single">
                    <DefaultValues>
                        <Value>Gold</Value>
                    </DefaultValues>
                </AttributeSchema>
            </Dynamic>
        </Schema>
    </Product>
</ProductConfiguration>
```

Configuration Management

The following describes the DTD (data type definition) which, in one embodiment, is used to provide the configuration information for a server or service. A server or service's configuration information starts with the element Configuration. In one embodiment, the element Configuration can have its own elements.

One such element of Configuration is ServiceURL. ServiceURL provides a list of URLs where the server or service is installed and running. The ServiceURL element is optional and is valid for services that have a client-server architecture, and the URLs represent the location of the server.

Another element of Configuration is PluginSchema. PluginSchema defines Java plugin objects that have been developed for the service, along with the parameter names that can be used to initialize a plugin instance.

Another element of Configuration is AttributeValuePair. AttributeValuePair provides the configuration data for the service.

Yet another element of Configuration is PluginConfig. PluginConfig provides the name of the plugin (along with its initialization parameters) that must be loaded by the service. Additionally, it is possible to assign priorities to the plugin modules to decide the order in which they will be loaded.

Another element of Configuration is GlobalConfiguration. GlobalConfiguration provides configuration information that is globally defined for the service.

Still another element of Configuration is OrganizationConfiguration. OrganizationConfiguration provides configuration information for an organization.

Another element of Configuration is InstanceConfiguration. InstanceConfiguration provides configuration information for an instance of the service.

In one embodiment, the element ServiceURL is valid only if the corresponding ServiceSchema has defined the element HasServiceURLs. When defined, it provides the URLs for the service instances. The element has a name attribute which gives a user friendly name for that instance of the service, and an url attribute that gives the URL of the service instance.

The element PluginSchema is used, in one embodiment, to define a plugin module that can be configured for the service. It defines the class name that implements the interface and definitions for the parameters that can be configured (using the AttributeSchema element). However, in order for the service to dynamically load the plugin, it must be configured using the PluginConfig element. Table Two, below, contains, in one embodiment, a list of supported attributes as they relate to the element PluginSchema. It is appreciated that the contents of Table Two are exemplary in nature, and as such, should not be considered exhaustive.

TABLE TWO

| Name | Specifies the name for the plugin |
|---|---|
| Type | Specifies the PluginInterface type, e.g., it should match one of the PluginInterfaces defined in either ServiceSchema or ServiceSubSchema. |
| Class | Gives the fully qualified Java class name that implements the interface. |
| jarURL | Gives the URL for the Java library that implements the interface. |
| i18nJarURL | Gives the URL of the jar (Java archive) file that contains I18N properties file. |
| i18nFileName | Gives the name of the property file. |
| i18nKey | Gives the I18N index key that describes the plugin. |

The element AttributeValuePair, in one embodiment, configures a specific service configuration parameter. It has an Attribute and Value sub-elements to specify the name of the service configuration parameter being configured and the value for the configuration parameter respectively.

The element PluginConfig, in one embodiment, contains the configuration data for a plugin using AttributeValuePair elements. It has a name attribute that identifies the name of the plugin that is being configured.

The elements GlobalConfiguration, Instanceconfiguration and OrganizationConfiguration, in one embodiment, define the configuration information for server or service's sub-schema components Global, Instance and Organization respectively.

Additionally the elements can have SubConfiguration elements (similar to SubSchema elements) that provide the configuration information for service's sub-components.

It is appreciated that, in one embodiment, the Global, Organization, Instance and SubConfiguration elements also support the additional sub-elements. One such supported element is AttributeValuePair, which provides the configuration data. Another supported element is PluginConfig, that provides the configuration data for the plugins that must be loaded. Still another supported element is SubConfiguration, that provide configuration information for its sub-components.

The following gives an example of authentication service's configuration data using schema defined previously. It defines a LDAP plugin module, and its configuration is for an organization entitled BB Incorporated.

```
<ProductConfiguration>
    <Product name="authentication">
        <Configuration>
            <PluginSchema name="jndiLdap" type="auth-modules"
                class="com.sun.security.auth.module.JndiLoginModule"
                jarURL="http://java.sun.com/products/jaas">
                <AttributeSchema name="flag" cardinality="single"
                    displayType="choice"
                    i18nKey="com.iplanet.auth.flag">
                    <ChoiceValues>
                        <Value>REQUIRED</Value>
                        <Value>OPTIONAL</Value>
                        <Value>SUFFICIENT</Value>
                        <Value>REQUISITE</Value>
```

-continued

```
                    </ChoiceValues>
                    <DefaultValues>
                        <Value>REQUIRED</Value>
                    </DefaultValues>
                </AttributeSchema>
                <AttributeSchema name="user.provider.url"
                    syntax="url" displayType="text"
                    cardinality="single"
                    i18nKey="com.iplanet.auth.userURL">
                    <DefaultValues>
                        <Value>ldap://pb:389/ou=people,
                            dc=sun, dc=com</Value>
                    </DefaultValues>
                </AttributeSchema>
                <AttributeSchema name="group.provider.url"
                    cardinality="single" displayType="text"
                    i18nKey="com.iplanet.auth.userURL">
                    <DefaultValues>
                        <Value>ldap://pb:389/ou=groups,
                            dc=sun, dc=com</Value>
                    </DefaultValues>
                </AttributeSchema>
            </PluginSchema>
            <Organization name=BBEmployees>
                <PluginConfig name="jndiLdap" priority="1">
                    <AttributeValuePair>
                        <Attribute name="flag"/>
                        <Value>REQUIRED</Value>
                    </AttributeValuePair>
                    <AttributeValuePair>
                        <Attribute name="user.provider.url" />
                        <Value>
                        ldap://ldap.bb.com:389/ou=people, o=bb, o=ISP
                        </Value>
                    </AttributeValuePair>
                    <AttributeValuePair>
                        <Attribute name="group.provider.url" />
                        <Value>
                        ldap://ldap.bb.com:389/ou=groups, o=bb, o=ISP
                        </Value>
                    </AttributeValuePair>
                </PluginConfig>
            </Organization>
        </Configuration>
    </Product>
</ProductConfiguration>
```

It is appreciated that the above XML files are only examples of defining service parameters and configuring them.

Service and Server Management Software Development Kit

Figure 6:
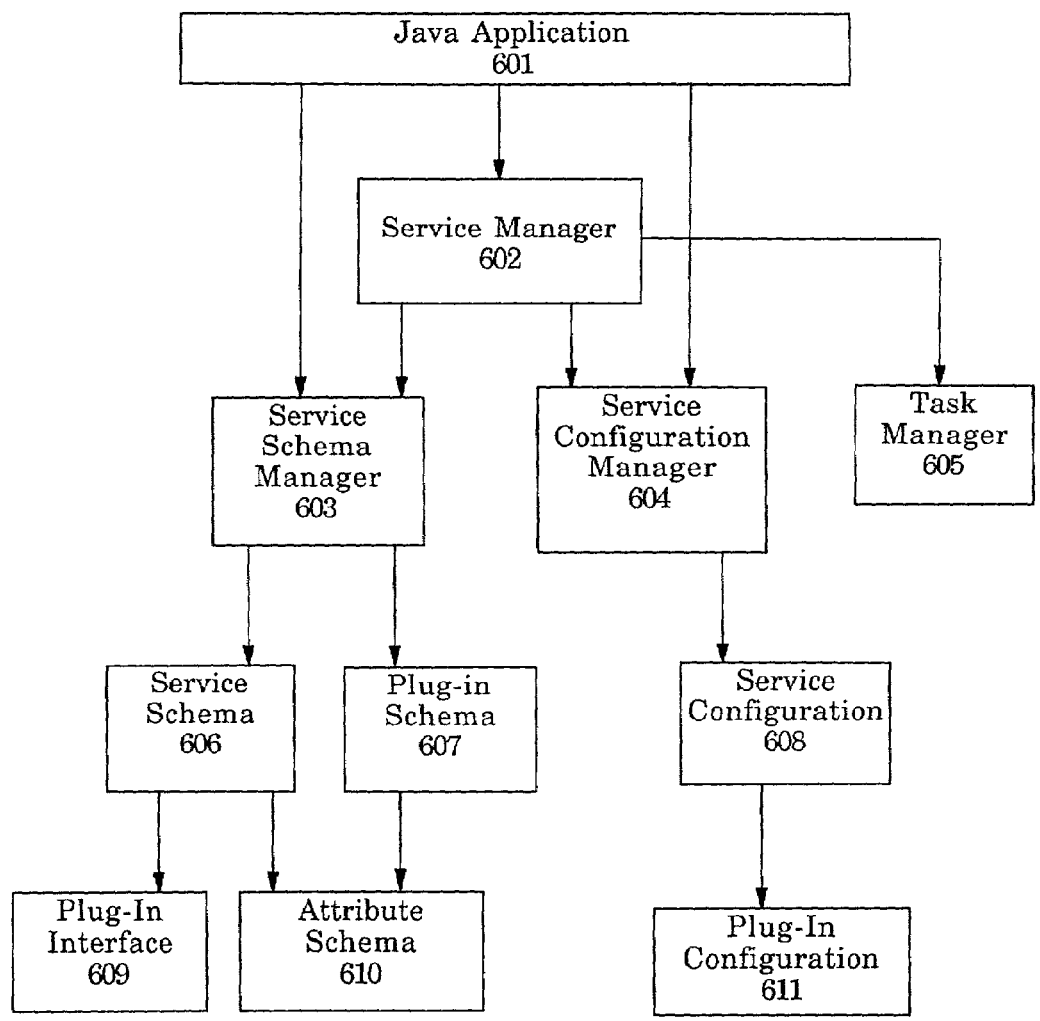
FIG. 6 is a block diagram of the software architecture of the Java classes, in accordance with one embodiment of the present invention.

SSMS provides Java interfaces to register server and services, and manage its tasks and configuration data. FIG. 6 shows, in one embodiment, a block diagram of the software architecture of the Java classes. The top level class is ServiceManager 602. ServiceManager 602 provides methods to register services and to list currently registered services.

Following ServiceManager 602, in FIG. 6, is ServiceSchemaManager 603, ServiceConfigManager 604 and TaskManager 605 to manage the server and services schema, configuration data and tasks respectively. ServiceSchemaManager 603 provides interfaces to access and manage the service's schema, e.g., adding/removing sub-schema, plugin-schema, checking if the service supports URLs and I18N information.

Still referring to FIG. 6, ServiceSchemaManager 603 provides access to ServiceSchema 606, which represents a single "schema" node in the DTD. The attribute schema defined in each "schema" node of the DTD can be accessed via Java class AttributeSchema 610.

Referring still to FIG. 6 and similar to ServiceSchemaManager 603 for managing service's schema, also shown is ServiceConfigManager 604 which manages the service's configuration data. ServiceConfigManager 604 provides access to ServiceConfig 608, which represents a single "Configuration" node in the DTD. Utilizing ServiceConfig 608, it is possible to get and set configuration parameters for the service.

Additionally, in FIG. 6, SSMS 2001 provides TaskManager 605, for managing server and service tasks. These interfaces can be used to get and modify tasks, but not for task execution.

The following tables, in one embodiment, contain descriptions of Java classes and interfaces supported by service and server management component. It is appreciated that additional classes and interfaces can be added as the need arises. Additionally, in the tables to follow, each Java class can have additional strings and methods, dependent upon the application and implementation. Accordingly, each of the tables below should be thought of as exemplary, and should not be construed as exhaustive.

Table Three, below, contains, in one embodiment, the constructor, method strings, and a description of what is invoked by the method string, that are associated with class ServiceManager 602.

TABLE THREE

Class name: com.iplanet.services.ServiceManager
(e.g., service manager 602 of FIG. 6)

Constructor

ServiceManager(SSOToken token) throws SMSException
    A single-sign-token is required to get an instance.

Methods void registerServices(InputStream xmlServiceSchema) throws SMSException
    Method to register new services, as defined by the XML file.
Set getServiceNames( ) throws SMSException
    Method to get all service names that have been registered.
ServiceSchemaManager getSchemaManager(String serviceName) throws SMSException
    Method to get the schema manager for the given service name.
ServiceConfigManager getConfigManager(String serviceName) throws SMSException
    Method to get the configuration manager given the service name.
TaskManager getTaskManager(String serviceName) throws SMSException
    Method to get the task manager for the server or service.

Table Four, below, contains, in one embodiment, the constructor, method strings, and a description of what is invoked by the method string, that are associated with class ServiceSchemaManager 603. It is appreciated that class ServiceSchemaManager 603 is also a subclass under ServiceManager 602.

TABLE FOUR

Class name: com.iplanet.services.ServiceSchemaManager
(e.g., ServiceSchemaManager 603 of FIG. 6)

Constructor

ServiceSchemaManager(SSOToken token, String serviceName) throws SMSException;
A single-sign-token is required to get an instance for the given service name.

TABLE FOUR-continued

Class name: com.iplanet.services.ServiceSchemaManager
(e.g., ServiceSchemaManager 603 of FIG. 6)

Methods

String getServiceName( )
    Method to get the service name.
String getI18nFileName( ) throws SMSException
    Method to get I18N properties file name for the service.
String getI18nJarURL( ) throws SMSException
    Method to get URL of the JAR file that contains the I18N properties file.
Boolean hasServiceURLs( ) throws SMSException
    Returns true if the service provides a XML interface over http(s).
    The method ServiceConfigManager.
ServiceSchema getSchema( ) throws SMSException
    Method to obtain the service configuration schema of the root node.
Set getPluginSchemaNames( ) throws SMSException
    Methods to get plugins configured for the service.
PluginSchema getPluginSchema(String pluginName) throws SMSException
    Method to get the schema for the configured plugin.

Table Five, below, contains, in one embodiment, the method strings and a description of what is invoked by the method string, that are associated with a ServiceSchema, e.g., ServiceSchema 606. It is appreciated that because ServiceSchema 606 is a subclass of ServiceSchemaManager 603, a constructor to access ServiceSchema 603 is not required.

TABLE FIVE

Class name: com.iplanet.services.ServiceSchema
(e.g., ServiceSchema 606 of FIG. 6)

Methods

String getI18nKey( )
    Method to get the I18N key that points to the description of the service.
Set getAttributeSchemaNames( )
    Method to get the names of the attributes that can configured for this service node.
AttributeSchema getAttributeSchema(String attributeName)
    Method to get the schema for the given attribute name.
Set getPluginInterfaceNames( )
    Method to get plugin interfaces the service has made public. The plugins
    written for this service implement one of these interfaces.
PluginInterface getPluginInterface(String pluginInterfaceName)
    Method to get the plugin interface.
Set getSubSchemaNames( )
    Method to get sub schema names.
ServiceSchema getSubSchema(String subSchemaName)
    Method to get sub-schema.

Table Six, below, contains, in one embodiment, the method strings and a description of what is invoked by the method string, that are associated with an AttributeSchema, e.g., AttributeSchema 610 of FIG. 6. Analogous to Table Five, a constructor to access AttributeSchema 610 is not required.

TABLE SIX

Class name: com.iplanet.services.AttributeSchema
(e.g., AttributeSchema 610 of FIG. 6)

Methods

String getName( )
        Method to get the attribute name;

TABLE SIX-continued

Class name: com.iplanet.services.AttributeSchema
(e.g., AttributeSchema 610 of FIG. 6)

String getI18nKey( )
    Method to get the I18N key.
AttributeSchema.DisplayType getDisplayType( )
    Returns the display type of the attribute (discussed below).
AttributeSchema.Syntax getSyntax( )
    Returns the syntax of the attribute (discussed below).
Set getDefaultValues( )
    Method to get the default values for the attributes. These are the values
    configured via service registration XML file.
Set getChoiceValues( )
    Method to get the choice values if the attribute type is either
    "single_choice" or "multiple_choice".
String getStartRange( )
    Method to get the start range if the attribute syntax is either
    "number_range" or "decimal_range".
String getEndRange( )
    Method to get the end range if the attribute syntax is either
    "number_range" or "decimal_range".
Boolean isServiceIdentifier( )
    Return true if it is service identifier attribute (i.e., COS specifier).
Boolean isStatusAttribute( )
    Return true if it the service's status attribute.

Table Seven, below, contains, in one embodiment, the static variables applicable to AttributeSchema.Cardinality, an attribute of an AttributeSchema e.g., AttributeSchema 610 of FIG. 6. Analogous to Table Five, a constructor to access AttributeSchema.Cardinality is not required.

TABLE SEVEN

Class name: com.iplanet.services.AttributeSchema.Cardinality
Static Variables:

| | |
|---|---|
| SINGLE: | Attribute can have only a single value. |
| MULTI: | Attribute can have multiple values. |

Table Eight, below, contains, in one embodiment, the static variables applicable to AttributeSchema.DisplayType, an attribute of an AttributeSchema, e.g., AttributeSchema 610 of FIG. 6. Analogous to Table Five, a constructor to access AttributeSchema.DisplayType is not required.

TABLE EIGHT

Class name: com.iplanet.services.AttributeSchema.DisplayType
Static Variables

| | |
|---|---|
| TEXT: | Attribute is a text. |
| LIST: | Attribute can have only a single value. |
| CHOICE: | Attribute can have a list of values. |
| FILENAME: | Attribute can have a single value, but from a list of choice values. |
| CERTIFICATE: | Attribute can have values which are certificates. |
| GIF: | Attribute can have a gif image. |
| JPEG: | Attribute can have a jpeg image. |
| BIN: | Attribute can have a binary data. |

Table Nine, below, contains, in one embodiment, the static variables applicable to AttributeSchema.Syntax, an attribute of an AttributeSchema, e.g., AttributeSchema 610 of FIG. 6. Analogous to Table Five, a constructor to access AttributeSchema.DisplayType is not required.

TABLE NINE

Class name: com.iplanet.services.AttributeSchema.Syntax
Static Variables

| | |
|---|---|
| BOOLEAN: | The attribute can have Boolean values of yes/no or true/false. |
| STRING: | A byte array. |
| PASSWORD: | Similar to STRING, but is used as a password. |
| DN: | The attribute is a LDAP distinguished name (DN). |
| EMAIL: | The attribute is an email address. |
| URL: | The attribute is an URL. |
| PERCENT: | The attribute represents a percent i.e., value between 0–100. |
| NUMBER: | The attribute has numeric values. |
| DECIMAL: | The attribute has decimal values. |
| NUMBER_RANGE: | The attribute has numeric values but within a specified range. |
| DECIMAL_RANGE: | The attribute has decimal values but within a specified range. |

Table Ten, below, contains, in one embodiment, the constructor, method strings, and a description of what is invoked by the method string, that are associated with a ServiceConfigManager, e.g., ServiceConfigManager 604 of FIG. 6.

TABLE TEN

Class name: com.iplanet.services.ServiceConfigManager
(e.g., ServiceConfigManager 604 of FIG. 6)

Constructor

ServiceConfigManager(SSOToken token, String serviceName) throws UMSException
A single-sign-token is required to get an instance for the given service name.

Methods

String getName( )
    Method to get the service name.
Map getURLs( )
    Method to get the service URLs, if the service provides web-based services. Usually, URLs represents instances of the service.
void addURL(String name, String serviceURL) throws SMSException
    Method to add a web-based service URL.
void removeURL(String name) throws SMSException
    Method to remove a web-based service URL.
ServiceConfig getObjectConfig(String name, ServiceConfigManager.Type objType, String orgName) throws SMSException
    Method to get the service configuration parameters for the given service
    sub-configuration name, object type (GLOBAL, INSTANCE, or ORGANIZATION) and organization name. The orgName parameter is
    ignored if the requested object type is either GLOBAL or INSTANCE.

Table Eleven, below, contains, in one embodiment, the static variables that are associated with an ServiceConfigManager.Type, an attribute of a ServiceConfigManager, e.g., ServiceConfigManager 604 of FIG. 6. Analogous to the other subclasses, a constructor to access ServiceConfigManager.Type is not required.

TABLE ELEVEN

Class name: com.iplanet.services.ServiceConfigManager.Type
Static Variables

| | |
|---|---|
| GLOBAL: | Represents configuration data that applies to all service instances. |

TABLE ELEVEN-continued

Class name: com.iplanet.services.ServiceConfigManager.Type
Static Variables

| | |
|---|---|
| INSTANCE: | Represents configuration data that applies to instances of the service. |
| ORGANIZATION: | Represents configuration data that applies to organizations. |

Table Twelve, below, contains, in one embodiment, the method strings and a description of what is invoked by the method string, that are associated with an ServiceConfiguration, e.g., ServiceConfiguration 608 of FIG. 6. It is appreciated that because ServiceConfiguration 608 is a subclass of ServiceConfigurationManager 604, and since the constructor of ServiceConfigurationManager 604 activates that interface, a constructor for sub-interface ServiceConfiguration 608 is not required.

TABLE TWELVE

Class name: com.iplanet.services.ServiceConfig
(e.g., ServiceConfiguration 608 of FIG. 6)
Methods String getName( )
    Method to get the service's sub-configuration name.
Map getAttributes( ) throws SMSException
    Method to get the service sub-configuration parameters.
    The keys in the Map contains the attributes names
    and their corresponding values in the
    Map is a Set that contains the values for the attribute.
Boolean setAttributes(Map attrs) throws SMSException
    Method to set the configuration parameters for the service.
    This replaces the old values for the specified attributes.
Boolean addAttribute(String attrName, Set attrValues)
throws SMSException
    Method to add a specific configuration parameter for the service.
void removeAttribute(String attrName) throws SMSException
    Method to remove the specified configuration parameter.
void removeAttributeValues(String attrName, Set attrValues) throws
SMSException
    Method to remove the specific values for the given configuration
    parameter.
void replaceAttributeValue(String attrName, String oldValue,
String newValue) throws SMSException
    Method to replace the specified oldValue of the attribute with the
    newValue. Will throw an exception if the oldValue does not exist.
void replaceAttributeValues(String attrName, Set oldValues,
Set newValues) throws SMSException
    Method to replace the specified oldValues of the attribute with the
    newValues. Will throw an exception if the oldValues does not exist.
Set getSubConfigNames( ) throws SMSException
    Method to get sub-configuration names.
ServiceConfig getSubConfig(String subConfigName) throws
SMSException
    Method to get the service sub-configuration.

The following subclasses, in one embodiment, provide support for dynamically implemented plugins for services. It is appreciated that additional subclasses can be added and existing classes can be modified as needed.

Table Thirteen, below, contains the method strings, and a description of what the method strings invoke, as related to a PluginInterface, e.g., PluginInterface 609 of FIG. 6. It is appreciated that because PluginInterface 609 is a subclass of a ServiceSchema, e.g., ServiceSchema 606 of FIG. 6, a constructor for PluginInterface 609 is not required.

TABLE THIRTEEN

Class name: com.iplanet.services.PluginInterface (609 of FIG. 6)
Methods

String getName( )
    Method to get the name for the plugin interface.
String getInterfaceClassName( )
    Method to get the fully qualified Java class name for the plugin.
String getI18nKey( )
    Method to get the I18N key that describes the plugin interface.

Table Fourteen, below, contains the method strings, and a description of what the method strings invoke, as related to a PluginSchema, e.g., PluginSchema 607 of FIG. 6. It is appreciated that because PluginInterface 607 is a subclass of a ServiceSchemaManager, e.g., ServiceSchemaManager 606 of FIG. 6, a constructor for PluginSchema 607 is not required.

TABLE FOURTEEN

Class name: com.iplanet.services.PluginSchema
(e.g., PluginSchema 607 of FIG. 6)
Methods String getName( )
    Method to get the name for the plugin implementation.
String getInterfaceName( )
    Method to get the plugin interface name that is implemented by the
    plugin implementation.
String getClassName( )
    Method to get the fully qualified Java class name that implements the
    plugin interface class name.
Set getAttributeSchemaNames( )
    Method to get the configuration parameters for the plugin.
AttributeSchema getAttributeSchema(String attrName)
    Method to get the schema of the given attribute name.
String getI18nJarURL( )
    Method to get the URL of the JAR file that has
    the I18N properties file
    that should be used to map I18N keys for the plugin attributes.
String getI18nFileName( )
    Method to get the I18N properties file name.
String getI18nKey( )
    Method to get the I18N key that describes the plugin.

Table Fifteen, below, contains the method strings, and a description of what the method strings invoke, as related to a PluginConfiguration, e.g., PluginConfiguration 611 of FIG. 6. It is appreciated that because PluginConfiguration 611 is a sub-subclass of ServiceConfigurationManager 604 of FIG. 6, a constructor for PluginConfigurationSchema 607 is not required.

TABLE FIFTEEN

Class name: com.iplanet.services.PluginConfig (611 of FIG. 6)
Methods

String getPluginName( )
    Method to get the plugin name.
String getPluginInterfaceName( )
    Method to get the name of the plugin interface.
Map getAttributes( ) throws SMSException
    Method to get the service sub-configuration parameters. The keys in
    the Map contains the attributes names and their corresponding
    values in the Map is a Set that contains the values for the attribute.
Boolean setAttributes(Map attrs) throws SMSException
    Method to set the configuration parameters for the service.
    This replaces the old values for the specified attributes.

TABLE FIFTEEN-continued

Class name: com.iplanet.services.PluginConfig (611 of FIG. 6)
Methods

Boolean addAttribute(String attrName, Set attrValues)
throws SMSException
    Method to add a specific configuration parameter for the service.
void removeAttribute(String attrName) throws SMSException
    Method to remove the specified configuration parameter.
void removeAttributeValues(String attrName, Set attrValues) throws
SMSException
    Method to remove the specific values for the given configuration
    parameter.
void replaceAttributeValue(String attrName, String oldValue, String
newValue) throws SMSException
    Method to replace the specified oldValue of the attribute with the
    newValue. Will throw an exception if the oldValue does not exist.
void replaceAttributeValues(String attrName, Set oldValues, Set
newValues) throws SMSException
    Method to replace the specified oldValues of the attribute with the
    newValues. Will throw an exception if the oldValues does not exist.
int getPriority( )
    Method to get the priority assigned for the plugin.
void setPriority(int priority) throws SMSException
    Method to set the priority for the plugin.

DIT & Schema for Directory Server

This section describes the LDAP DIT (lightweight directory access protocol and document information type, respectively) & Schema that will, in one embodiment, be used by SSMS to store server and service tasks, configuration schema and parameters in the directory server. As described above, the configuration data for a service can be classified as global, instance, organization, user and policy.

Figure 7A:
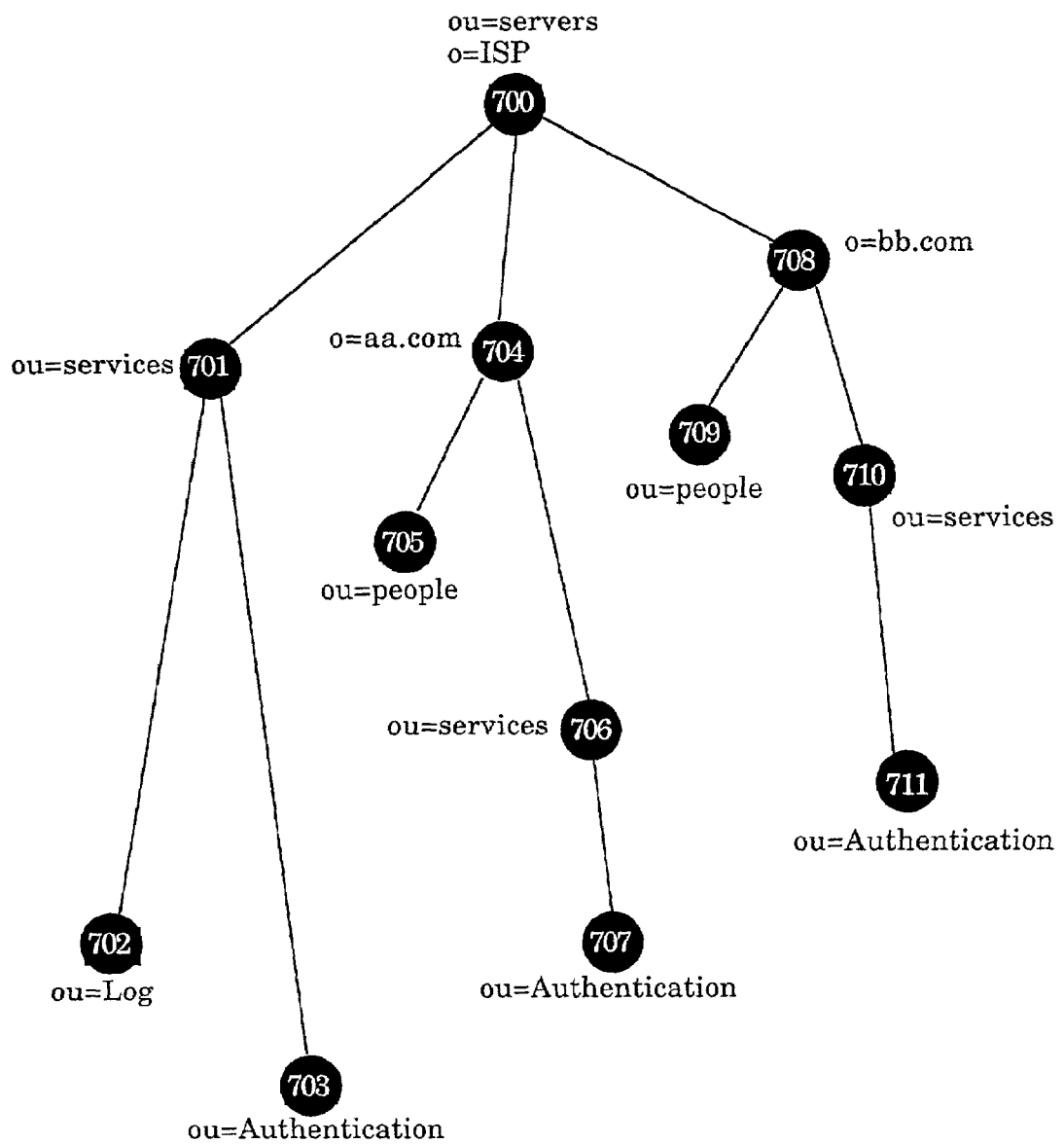
FIG. 7A is a block diagram of two services that are common across organizations and each organization having its own configuration information for authentication service, in accordance with one embodiment of the present invention.

In general, the server and service tasks which are global will be stored under the root node as ou=servers, e.g., node 700 of FIG. 7A, while the configuration data that is global and instance specific will be stored under the root node as ou=services, e.g., 701 of FIG. 7A, and configuration information that is specific to an organization will be stored under the organization's node as ou=services, e.g., nodes 704 and 705 of FIG. 7A.

FIG. 7A shows the pictorial representation of two services, log and authentication, that is common across all organizations and each organization has its own configuration information for authentication service. The configuration data for user objects and policy are managed by the User Management and Policy Management components.

The object class that, in one embodiment, defines the services node under both root node, e.g., o=ISP 700, ou=services 701, and organization node, e.g., o=ISP 700, o=bb.com 708, and ou=services 710 is organizationalUnit (ou) as defined by LDAP schema.

Still referring to FIG. 7A, the object class that, in one embodiment, defines each service, e.g., ou=log 702, ou=services 701, o=ISP 700 and ou=authentication 707, ou=services 706, o=aa.com 704, and o=ISP 700 is iplanetservice. The iplanetservice object class provides an attribute to store the serialized XML service schema and plugin schema for the service called iplanetserviceschema and pluginschema respectively, an attribute to store the service URLs called labeleduri, an attribute to store configuration data called iplanetkeyvalue, and finally an attribute to store the description.

The description of the attributes and object class are, in one embodiment, as follows:

attributeTypes: (iplanetserviceschema-OID NAME ('iplanetserviceschema') DESC 'Attribute to Store XML schema of a particular service' SYNTAX 1.3.6.1.4.1.1466.115.121.1.15 SINGLE-VALUE)

attributeTypes: (pluginschema-OID NAME ('pluginschema') DESC 'To store the plugin schema information' SYNTAX 1.3.6.1.4.1.1466.115.121.1.15)

attributeTypes: (iplanetkeyvalue-OID NAME ('iplanetkeyvalue') DESC 'Attribute to store the encoded key values of the services' SYNTAX 1.3.6.1.4.1.1466.115.121.1.26)

attributeTypes: (iplanetxmlkeyvalue-OID NAME ('iplanetxmlkeyvalue') DESC 'Attribute to store the key values in XML format' SYNTAX 1.3.6.1.4.1.1466.115.121.1.26)

objectClasses: (iplanetservice-oid NAME 'iplanetservice' DESC 'object containing service information' SUP top MUST (ou) MAY (labeleduri $ iplanetserviceschema $ iplanetkeyvalue $ iplanetxmlkeyvalue $ pluginschema $ description))

The object class that defines each service which is specific to an organization, e.g., ou=authentication 707, ou=services 706, o=aa.com 704, o=ISP 700 of FIG. 7A is, in one embodiment, as follows:

objectClasses: (iplanetorgservice-oid NAME 'iplanetorgservice' DESC 'Service information specific to organizations' SUP top MUST (ou) MAY (iplanetkeyvalue $ iplanetxmikeyvalue $ description))

Service Sub-Components

A service could, in one embodiment, have sub-components that require configuration information. These are represented by ServiceSubConfig elements defined by the DTD. These sub-components are represented by child nodes under the service nodes, e.g., nodes 701 and 702 of FIG. 7A.

Figure 7B:
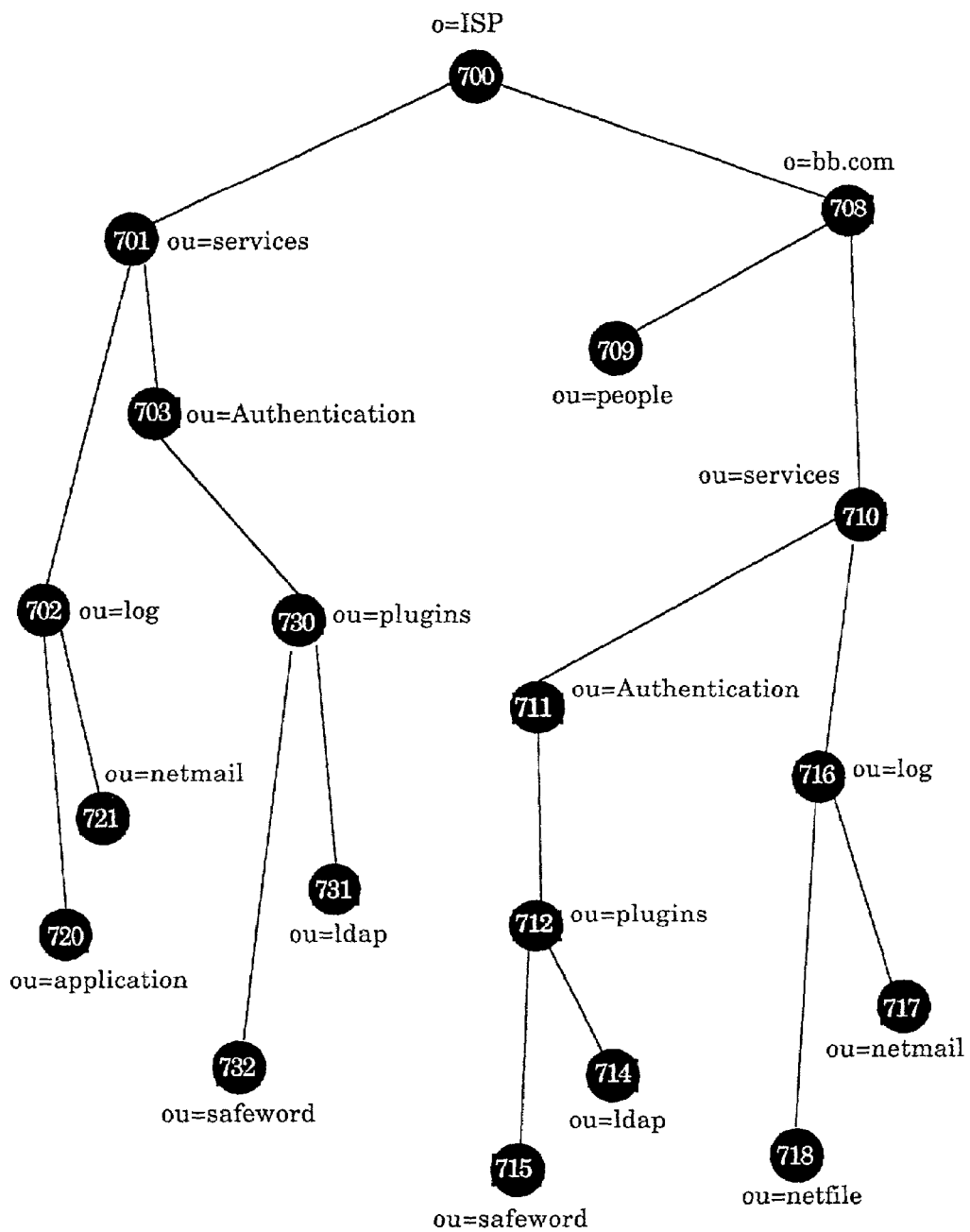
FIG. 7B is a block diagram of the sub components for a provided service, in accordance with one embodiment of the present invention.

FIG. 7B shows the sub components for the log service, which are netmail 721 under the root node 701, and netmail 717 and netfile 718 under organization node, o=bb.com 708.

The object class that defines a service's sub-component information, e.g., ou=netmail 721, ou=log 702, ou=services 701, o=ISP 700 and an organization's sub-component information, e.g., ou=netfile 718, ou=log 716, ou=services 710, o=bb.com 708, and o=ISP 700 is given below. The object class, in one embodiment, has the following attributes:

iplanetserviceid to identify the ServiceSubSchema whose schema definition will be used.

iplanetsmspriority to define its priority, iplanetkeyvalue to store the configuration data, and description.

attributeTypes: (iplanetserviceid-OID NAME ('iplanetserviceid') DESC 'Attribute to store the reference to the inherited object' SYNTAX 1.3.6.1.4.1.1466.115.121.1.15 SINGLE-VALUE)

attributeTypes: (iplanetsmspriority-OID NAME ('iplanetsmspriority') DESC 'To store the priority of the service with respect to its siblings' SYNTAX 1.3.6.1.4.1.1466.115.121.1.27 SINGLE-VALUE)

objectClasses: (iplanetservicecomponent-oid NAME 'iplanetservicecomponent' DESC 'Sub-components of the service' SUP top MUST (ou) MAY (iplanetserviceid $ iplanetsmspriority $ iplanetkeyvalue $ iplanetxmlkeyvalue $ description))

Schema for Plugin Objects

Since service could, in one embodiment, be configured to use plugin objects, it is necessary to store plugin's schema and configuration information. The schema for the plugin is stored in the form of a serialized XML string in an attribute along with the service configuration information. The plugins (e.g., 712 and 730 of FIG. 7B) used for authentication service, e.g., ldap and safeword are stored as values for the attribute iplanetpluginschema. With reference to FIG. 7B, the serialized XML string for ou=authentication 703 and ou=authentication 711 can be the following:

iplanetpluginschema: idap=<XML>
    iplanetpluginschema: safeword=<XML>
    iplanetpluginschema: unix=<XML>

Still referring to FIG. 7B, subsequent to defining the plugins, it is necessary to specify which of these plugins need to be loaded either for an organization or as default, along with its initial parameters. The organizationalUnit (ou) object class, in one embodiment, will be used to define the sub-tree which contains plugin objects to be loaded by a service, e.g., ou=plugins 712 and 730, ou=authentication 703 and 711, ou=services 701 and 708, and o=ISP.com 700.

The object class that, in one embodiment, defines the plugin objects to be loaded by a service, e.g., ou=ldap 714 and 731, ou=plugins 712 and 730, ou=authentication 703 and 711, ou=services 701 and 708, and o=ISP.com 700 is as follows:

attributeTypes: (iplanetpluginid-OID NAME ('iplanetpluginid') DESC 'Attribute to store reference to the plugin configuration' SYNTAX 1.3.6.1.4.1.1466.115.121.1.15 SINGLE-VALUE)

objectClasses: (iplanetserviceplugin-oid NAME 'iplanetserviceplugin' DESC 'Object that stores information specific to plugins' SUP top MUST (ou) MAY (iplanetpluginid $ iplanetkeyvalue $ iplanetxmikeyvalue $ iplanetsmspriority))

Service Configuration Information

Figure 7C:
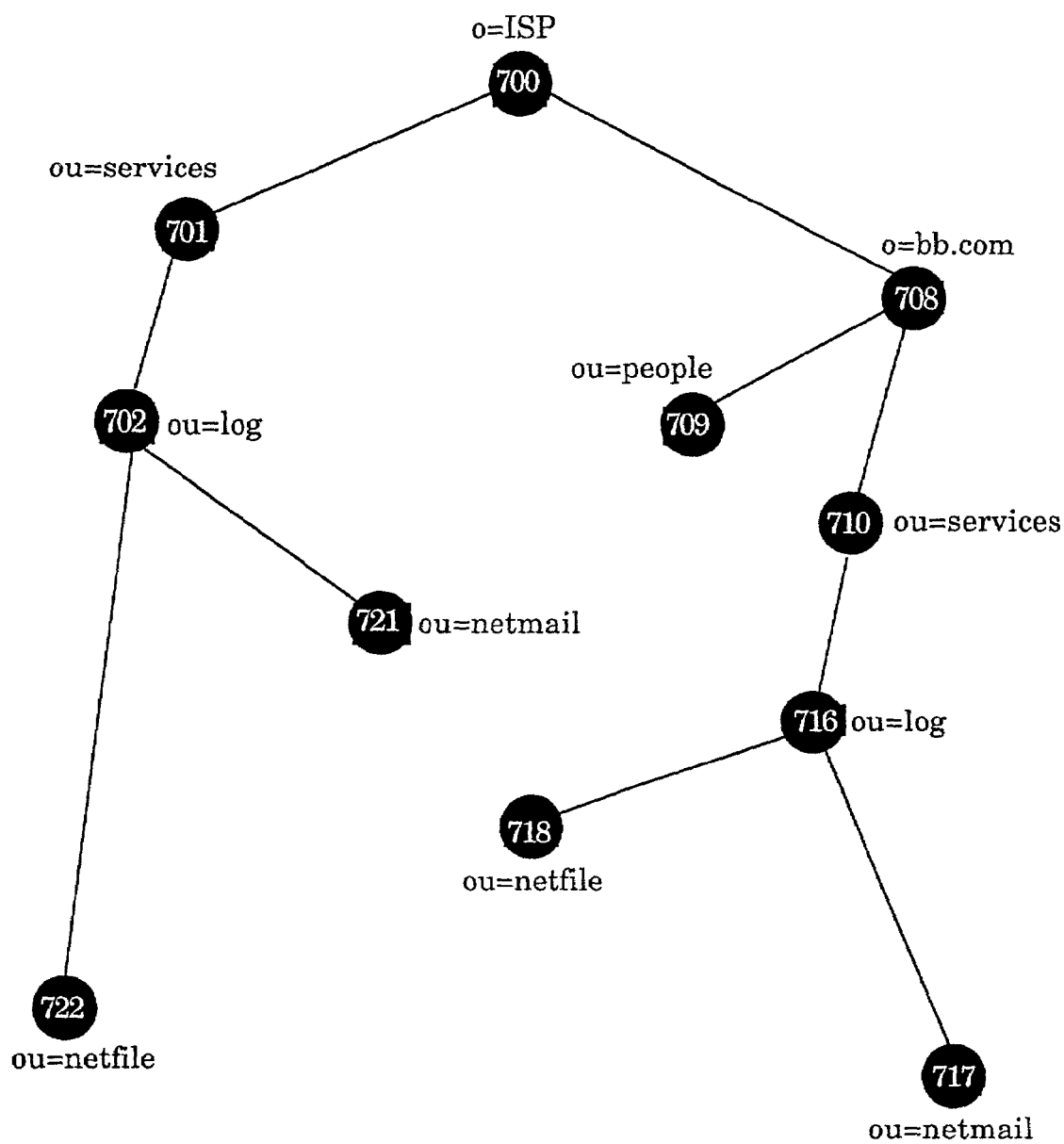
FIG. 7C is a block diagram of the configuration of the provided service as shown in FIG. 7B.

A service could have any number of configuration parameters, as defined by AttributeSchema elements in the DTD (document type definition) discussed above. The value for the configuration parameters is, in one embodiment, defined by AttributeValuePair and must be stored in the directory. FIG. 7C shows the DIT (directory information tree) having the configuration schema and the values for the log service.

In FIG. 7C, the configuration schema and value for root node 701, ou=log 702, ou=netmail 721 is, in one embodiment:

iplanetkeyvalue: loglevel=off.

Also in FIG. 7C, the configuration schema and values for root node 701, ou=log 702, ou=netfile 722 are, in one embodiment:

iplanetkeyvalue: loglevel=SEVERE
    iplanetkeyvalue: backend=file
    iplanetkeyvalue: netfile.log Still referring to FIG. 7C, the configuration schema and values for organization node 708, ou=services 710, ou=log 716, ou=netfile 718 are, in one embodiment:

iplanetkeyvalue: loglevel=INFO
    iplanetkeyvalue: backend=FILES
    iplanetkeyvalue: filename=mail.log.

The configuration schema and values for ou=netmail 717, a child of o=log 716 are, in one embodiment:

iplanetkeyvalue: loglevel=SEVERE
    iplanetkeyvalue: backend=JDBC
    iplanetkeyvalue: server=db.bb.com Server and Service Registration DTD (Data Type Definition)

The following is an XML DTD which defines server and service tasks, in one embodiment of the presentation. It is appreciated that each of the following server and service registration DTDs is preceded by a description of what the registration DTD provides or enables. It is further appreciated that the DTDs below should not be construed as exhaustive, but as examples of the DTDs that can be implemented in accordance with embodiments of the present invention.

This DTD defines the data structure that will be used by servers and services to define their configuration information and its management tasks. Unique Declaration name for DOCTYPE tag:

"Service and Server Management Services (SSMS) 2.0 DTD"

Provides the I18N key required to get description in a given locale. If this is not provided it uses the name of the configuration parameter as the I18N key.

<!ENTITY % i18nlndex "i18nKey CDATA #IMPLIED">

ProductConfiguration is the root for all server's and service's configuration parameters and tasks. Multiple servers and services can be registered using a single XML file.

<!ELEMENT ProductConfiguration (Product)+>

Product defines a server or service specific tasks (Tasks), configuration parameter's schema (Schema) and/or configuration data (Configuration). Examples of servers are Web server (iWS), directory server (iDS), etc. And, examples of services (or components) are authentication, session, log, user management (ums), policy, etc. (the word service and component are used interchangeably). The attribute name provides the name of the product, and version specifies the version of the product.

```
<!ELEMENT    Product      ( Tasks?, Schema?, Configuration? ) >
<!ATTLIST    Product
    name            NMTOKEN         #REQUIRED
    version         NMTOKEN         #REQUIRED
>
```

Tasks define the server or service specific tasks that can be executed.

```
<!ELEMENT Tasks     ( Task )+ >
```

Task defines a specific operation that can be performed on the specified server or service. A task contains an Action element that will determine the action be executed, and a Display element that will interpret the results of the action and provide an user interface. In the case of command line interfaces, the Display element will output to the terminal and in the case of web browser it will generate HTML. The attribute name gives the name of the task, and description provides a description of the task.

```
<!ELEMENT    Task         ( Action, Display? ) >
<!ATTLIST    Task
    name            NMTOKEN         #REQUIRED
    description     CDATA           #IMPLIED
>
```

The Action element provides sub-elements to define different types of applications that can be executed. They are executables either C or shell scripts (identified by Executable element), Java applications (identified by JavaProgram element), servlets in which doPost( . . . ) method will be called (identified by Servlet element) and CGI (identified by CGI element). <!ELEMENT Action (Executable |JavaProgram |Servlet |CGI)>

Executable element identifies an executable program that will perform the requested action. The attribute commandName should be a fully qualified file name will be executed when this action is invoked. The action will be performed on the machine in which the product has been installed.

```
<!ELEMENT    Executable    EMPTY >
<!ATTLIST    Executable
    commandName    CDATA    #REQUIRED
>
```

JavaProgram element identifies a Java application that will perform the requested action. The attribute className specifies the fully qualified Java class name that will be executed, the attribute jarURL gives the URL of the jar file which contains the Java class. In the absence of this attribute, it is assumed that the Java class is specified in the CLASSPATH environment variable. Since the action is a Java program which ideally can be run on any machine, the last attribute executionMode specifies if there is a restriction on the application to be executed on the installed machine.

```
<!ELEMENT    JavaProgram    EMPTY >
<!ATTLIST    JavaProgram
    className        CDATA                          #REQUIRED
    jarURL           CDATA                          #IMPLIED
    executionMode    ( any | atInstalledMachine )   "any"
>
```

Servlet element is similar to Java application, except that its doPost method will be invoked with HttpRequest and HttpResponse.

```
<!ELEMENT    Servlet    EMPTY >
<!ATTLIST    Servlet
    className        CDATA                          #REQUIRED
    jarURL           CDATA                          #IMPLIED
    executionMode    ( any | atInstalledMachine )   "any"
>
```

CGI element is similar to executable, except that its environment variables be appropriates set.

```
<!ELEMENT    CGI    EMPTY >
<!ATTLIST    CGI
    cgiName    CDATA    #REQUIRED
>
```

Display element identifies a Java application or a JSP that will provide the presentation.

```
<!ELEMENT    Display    EMPTY >
<!ATTLIST    Display
    displayProgram    CDATA    #REQUIRED
>
```

Schema defines the schema for the configuration parameters of the server or service. The sub-elements provide configuration parameter's schema for the respective parameter grouping. The attributes provide information for I18N, i.e., properties file name and the URL of the jar file which contains the properties file.

```
<!ELEMENT    Schema    ( Global?, Instance?, Organization?,
                         Dynamic?, Policy?, User? ) >
<!ATTLIST    Schema
    i18nJarURL       CDATA    #IMPLIED
    i18nFileName     CDATA    #IMPLIED
    (%i18nIndex;)
>
```

PluginInterface will be used if the service has a Pluggable architecture, in which case this element provides the name of interface class that must be implemented.

```
<!ELEMENT    PluginInterface    EMPTY>
<!ATTLIST    PluginInterface
    name         CDATA    #REQUIRED
    interface    CDATA    #REQUIRED
    (%i18nIndex;)
>
```

Global element provides grouping of configuration parameters that are globally applicable to all instances of its service or server. In case of servers and services are grouped, these configuration parameters are global to that group. The element Plugininterface specifies one or more Java interfaces which the products exposes for the customers to provide custom implementation. The schema of the configuration parameters is provided by AttributeSchema and if there is any necessity to sub-group additional configuration parameters they can grouped using SubSchema element.

```
<!ELEMENT    Global    (PluginInterface*, AttributeSchema*,
                        SubSchema*)
>
```

Instance element provides grouping of configuration parameters that are specific to a particular instance of the server or service. Examples are parameters like cache size, maximum number of threads, etc. The element Plugininterface specifies one or more Java interfaces which the products exposes for the customers to provide custom implementation. The schema of the configuration parameters is provided by AttributeSchema and if there is any necessity to sub-group additional configuration parameters they can grouped using SubSchema element.

```
<!ELEMENT    Instance    (PluginInterface*, AttributeSchema*,
                          SubSchema*)
>
```

Organization element provides grouping of configuration parameters that can be configured differently for various organization. Examples are parameters like organization's authentication mechanisms, logging information, etc. The element Plugininterface specifies one or more Java interfaces which the products exposes for the customers to provide custom implementation. The schema of the configuration parameters is provided by AttributeSchema and if there is any necessity to sub-group additional configuration parameters they can grouped using SubSchema element.

```
<!ELEMENT    Organization    (PluginInterface*, AttributeSchema*,
                                              SubSchema*) >
```

Dynamic element provides grouping of configuration parameters that are applicable to all user objects, with respect to this server or service. These attributes are usually implemented as COS (class of service) provided by iDS 5.0. Examples are parameters like status attributes, mail address, etc. The schema of the configuration parameters is provided by AttributeSchema.

```
<!ELEMENT Dynamic (AttributeSchema* )>
```

Policy element provides grouping of privileges that are specific to the server or service. Examples are privileges like canForwardEmailAddress, canChangeSalaryInformation, etc. The schema of the configuration parameters is provided by AttributeSchema.

```
<!ELEMENT Policy (AttributeSchema* )>
```

User element provides grouping of configuration parameters that are applicable to user objects, with respect to this server or service. Examples are parameters like social security number, email address, etc. The schema of the configuration parameters is provided by AttributeSchema.

```
<!ELEMENT User (AttributeSchema*)>
```

SubSchema defines the schema for a server or service that are grouped for logical purposes. The configuration information are stored as a subordinate node under the server or service. The name attribute provides the name for the sub-schema. The inheritance attribute specifies whether this schema can be inherited by only one or multiple configuration nodes using SubConfiguration elements. The maintainPriority attribute suggests if priority must be honored among its peer SubConfig elements.

```
<!ELEMENT SubSchema     (PluginInterface*, AttributeSchema*,
                                            SubSchema*) >
<!ATTLIST          SubSchema
    name                 CDATA              #REQUIRED
    inheritance          (single | multiple) "single"
    maintainPriority     (yes | no)          "no"
    (%i18nIndex;)
>
```

Configuration defines server or service specific configuration data. It also describes the plugins configured, URLs where the server or service can be reached (or is available). Other elements provide configuration parameter for the respective parameter grouping. Rules for policy privileges along with dynamic and user specific configuration data are configured separately using different XML DTDs.

```
<!ELEMENT Configuration   (ServiceURL*, PluginSchema*,
                           GlobalConfiguration?,
                           InstanceConfiguration*,
                           OrganizationConfiguration*)
>
```

ServiceURL defines an instance of the server or service by providing its URL. The name attribute gives a user friendly name that can used to identify the instance of the server or service, and url gives the URL for the server or service.

```
<!ELEMENT    ServiceURL    EMPTY>
<!ATTLIST    Service URL
    name                CDATA           #REQUIRED
    url                 CDATA           #REQUIRED
>
```

PluginSchema provides the information needed to dynamically download and instantiate the plugin for a server or service. The attributes name gives the name for the plugin, interfaceName defines the name of plugin interface implemented by the plugin, className gives the name of the Java class that implements the interface and jarURL gives the URL of the jar file. Other attributes provide I18N information for displaying localized messages.

```
<!ELEMENT      PluginSchema    (AttributeSchema*) >
<!ATTLIST      PluginSchema
    name                NMTOKEN         #REQUIRED
    interfaceName       NMTOKEN         #REQUIRED
    className           CDATA           #REQUIRED
    jarURL              CDATA           #IMPLIED
    i18nJarURL          CDATA           #IMPLIED
    i18nFileName        CDATA           #IMPLIED
    (%i18nIndex;)
>
```

PluginConfiguration defines the configuration information for a plugin within a server or service. The attribute pluginSchemaName specifies the name of the plugin schema for which the configuration parameters are provided, and priority specifies the priority for this plugin.

```
<!ELEMENT    PluginConfiguration   (AttributeValuePair)* >
<!ATTLIST    PluginConfiguration
    pluginSchemaName    CDATA           #REQUIRED
    priority            NMTOKEN         #IMPLIED
>
```

GlobalConfiguration defines the configuration parameters for all instances within a server or service group. The element AttributeValuePair provides the configuration data, PluginConfiguration provides configuration data for the plugins and SubConfiguration provides the configuration data for further sub-grouping of configuration parameters.

```
<!ELEMENT    GlobalConfiguration    (AttributeValuePair*,
                                     PluginConfiguration*,
                                     SubConfiguration*)
>
```

OrganizationConfiguration defines the configuration parameters for a particular organization. The attribute organizationName provides the name of the organization. The element AttributeValuePair provides the configuration data, PluginConfiguration provides configuration data for the plugins and SubConfiguration provides the configuration data for further sub-grouping of configuration parameters.

```
<!ELEMENT    OrganizationConfiguration    (AttributeValuePair*,
                                           PluginConfiguration*,
                                           SubConfiguration*) >
<!ATTLIST    OrganizationConfiguration
    name                CDATA             #REQUIRED
    (%i18nIndex;)
>
```

InstanceConfiguration defines the configuration parameters for a particular instance of the server or service. The attribute instanceName provides the name of the instance. The element AttributeValuePair provides the configuration data, PluginConfiguration provides configuration data for the plugins and SubConfiguration provides the configuration data for further sub-grouping of configuration parameters.

```
<!ELEMENT    InstanceConfiguration    (AttributeValuePair*,
                                       PluginConfiguration*,
                                       SubConfiguration*) >
<!ATTLIST    InstanceConfiguration
    instanceName        CDATA         #REQUIRED
    (%i18nIndex;)
>
```

SubConfiguration defines the configuration information for the sub nodes of the service specified by SubSchema. The attribute id refers to the name of the SubSchema whose schema is being used, name provides the name for this group configuration parameters and priority specifies the priority level for this configuration.

```
<!ELEMENT    ServiceSubConfig                (AttributeValuePair*,
                                              PluginConfiguration*,
                                              SubConfiguration*) >
<!ATTLIST    ServiceSubConfig
    name                      CDATA         #REQUIRED
    id                        CDATA         #IMPLIED
    priority                  NMTOKEN       #IMPLIED
    (%i18nIndex;)
>
```

AttributeValuePair defines generic attribute-values pair that can used to specify configuration information.

```
<!ELEMENT    AttributeValuePair    (Attribute, Value*) >
   Attribute defines the attribute name i.e., a configuration parameter.
<!Element    Attribute             EMPTY>
<!ATTLIST    Attribute
    name                           NMTOKEN            #REQUIRED
>
   Value defines the value within an attribute-value pair.
<!ELEMENT    Value        (#PCDATA) >
```

AttributeSchema defines a single configuration parameter for a service. The attribute name gives the name for the configurable parameter, displayType specifies how the attribute and its values are represented. Based on this attribute, the application displaying this attribute can generate appropriate mime-type. The property cardinality defines whether the attribute can have single or multiple values. The property syntax defines whether the parameter is Boolean, string, numeric or dn, rangestart and rangeEnd provide the starting and ending values for attribute syntax decimal$_{13}$ range and number range respectively and any provides means for service developers to add service specific information. The elements IsOptional, IsServiceIdentifier, IsStatusAttribute represent whether the attribute is optional, a service identifier (COS specifier) or status attribute respectively. The elements DefaultValues provides the default values for the parameter and ChoiceValues provides the possible values for the parameter if it is of choice type. The element Condition, if present specifies Boolean operations, which determines if the attribute is valid based on the current configuration data. If multiple Condition elements are present, it is sufficient if at least one of them satisfies the requirement (this provides OR implementation).

```
<!ELEMENT    AttributeSchema    (IsOptional?, IsServiceIdentifier?,
                                 IsStatusAttribute?, DefaultValues+,
                                 ChoiceValues?, Condition*) >
<!ATTLIST    AttributeSchema
  name               NMTOKEN                              #REQUIRED
  displayType        (text | list | choice | filename | certificate | gif
                                                | jpeg | bin)"text"
  cardinality        (single|multi)
  syntax             (boolean | string | password | dn |
                     email | url | numeric | percent | number |
                     decimal_number | number_range |
                     decimal_range)                       "string"
  rangeStart         CDATA                                #IMPLIED
  rangeEnd           CDATA                                #IMPLIED
  any                CDATA                                #IMPLIED
  (%i18nIndex;)
>
```

Condition specifies the condition of a peer attribute-value pair that must be satisfied for conditional attributes. Only if the current condition is satisfied, sub-ordinate conditions, if present, are evaluated (this provides AND implementation). The attribute operator provides a Boolean operation, and attributes attributeName and attributeValue provide the condition that must be met.

```
<!ELEMENT    Condition           (Condition*) >
<!ATTLIST    Condition
  operator           ( equals | notEquals )       "equals"
  attributeName      CDATA                        #REQUIRED
  attributeValue     CDATA                        #IMPLIED
>
  DefaultValues provide the default values for the attribute.
<!ELEMENT    DefaultValues               (Value+) >
  ChoiceValues provide the only possible values for the attribute.
<!ELEMENT    ChoiceValues                (Value)* >
  IsOptional defines that the attribute is optional.
<!ELEMENT    IsOptional          EMPTY >
  IsServiceIdentifier defines that the attribute identifies the kind of service offered.
<!ELEMENT    IsServiceIdentifier          EMPTY >
  IsStatusAttribute defines that the attribute will be used to determine the service status.
<!ELEMENT    IsStatusAttribute            EMPTY >
         Server and Service Registration XML Schema
```

The following is an example of a server and service registration XML schema as defined in accordance with embodiments of the present invention as has been described above. Accordingly, the exemplary registration schema that will follow, while relatively comprehensive, should be considered illuminatory, rather than exhaustive.

```
<schema xmlns:xsd="http://www.w3.org/2001/XMLSchema"
    xmlns:iSMS="http://docs.iplanet.com/2001/SMSSchema">
<annotation xml:lang="en">
<documentation>
   Server & Service Management Schema v2.0
</documentation>
</annotation>
<attributeGroup name="i18nIndex">
<attribute name="i18nKey" type="NMTOKEN"/>
```

-continued

```
</attributeGroup>
<attributeGroup name="i18nAttributeGroup">
<attribute name="i18nJarURL" type="anyURI" minOccurs="0"/>
<attribute name="i18nFileName" type="string" minOccurs="0"/>
</attributeGroup>
<element name="Product"/>
    <complexType>
        <sequence>
           <element ref="iSMS:Tasks" minOccurs="0"/>
           <element ref="iSMS:Schema" minOccurs="0"/>
           <element ref="iSMS:Configuration" minOccurs="0"/>
        </sequence>
        <attribute name="name" type="string" use="required"/>
        <attribute name="version" type="string" use="required"/>
    </complexType>
</element>
```

-continued

```
<element name="Tasks">
  <complexType>
    <sequence>
      <element ref="iSMS:Task" maxOccurs="unbounded"/>
    </sequence>
  </complexType>
</element>
<element name="Task">
<complexType>
  <sequence>
    <element name="Action">
      <complexType>
        <sequence>
          <element name="Executable"minOccurs="0">
            <complexType>
              <attribute
              name="commandName"type="string"/>
            </complexType>
          </element>
<element name="JavaProgram" type="ProgramDefinition" minOccurs=
"0"/>
<element name="Servlet" type="ProgramDefinition" minOccurs="0">
          <complexType name="ProgramDefinition">
            <attribute name="className" type="string"/>
            <attribute name="jarURL" type="anyURI"/>
            <attribute name="executableMode" default="any">
              <simpleType>
                <restriction base="string">
                  <enumeration value="any"/>
                  <enumeration
                    value="atInstallMachine"/>
                </restriction>
              </simpleType>
            </attribute>
          </complexType>
          <element name="CGI" minOccurs="0">
            <complexType>
              <attribute name="cgiName" type="string"/>
            </complexType>
          </element>
        </sequence>
      </complexType>
    </element>
    <element name="Display" minOccurs="0">
      <complexType>
        <attribute name="displayProgram" type="string"/>
      </complexType>
    </element>
  </sequence>
</complexType>
</element>
<element name="Schema">
<complexType>
  <all>
    <element ref="iSMS:Global" type="iSMS:GIOStructureDefinition"
                                              minOccurs="0"/>
    <element ref="iSMS:Instance" type="iSMS:GIOStructureDefinition"
                                              minOccurs="0"/>
    <element ref="iSMS:Organization"
             type="iSMS:GIOStructureDefinition" minOccurs="0"/>
    <element ref="iSMS:Dynamic" type=
    "iSMS:DPUStructureDefinition"
                                              minOccurs="0"/>
    <element ref="iSMS:Policy" type="iSMS:DPUStructureDefinition"
                                              minOccurs="0"/>
    <element ref="iSMS:User" type="iSMS:DPUStructureDefinition"
                                              minOccurs="0"/>
  </all>
  <attributeGroup ref="iSMS:i18nAttributeGroup"/>
  <attributeGroup ref="iSMS:i18nIndex"/>
</complexType>
</element>
<element name="PluginInterface">
<complexType>
  <attribute name="name" type="string"/>
  <attribute name="interface" type="string"/>
  <attributeGroup ref="iSMS:i18nIndex"/>
</complexType>
</element>
```

-continued

```
<group name="Values">
<element name="Value" type="string" minOccurs="0"
                                          maxOccurs="unbounded"/>
</group>
<complexType name="ConditionDefinition">
<attribute name="operation" default="equals">
  <simpleType>
    <restriction base="string">
      <enumeration value="equals"/>
      <enumeration value="notEquals"/>
    </restriction>
  </simpleType>
</attribute>
<attribute name="attributeName" type="NMTOKEN" use="required"/>
<attribute name="attributeValue" type="string" minOccurs="0"/>
</complexType>
<element name="AttributeSchema">
<complexType>
  <sequence>
    <element name="isOptional" type="any" nillable="true"/>
    <element name="isServiceIdentifier" type="any" nillable="true"/>
    <element name="isStatusAttribute" type="any" nillable="true"/>
    <element name="DefaultValues" minOccurs="0">
      <complexType>
        <group ref="Values"/>
      </complexType>
    </element>
    <element name="ChoiceValues" minOccurs="0">
      <complexType>
        <group ref="Values"/>
      </complexType>
    </element>
    <element name="Condition" type="ConditionDefinition"
             minOccurs="0" maxOccurs="unbounded">
      <complexType>
        <sequence>
          <element name="Condition"
             type="ConditionDefinition"
             minOccurs="0"
             maxOccurs="unbounded">
        </sequence>
      </complexType>
    </element>
  </sequence>
  <attribute name="name" type="NMTOKEN" use="required"/>
  <attribute name="displayType" default="text">
    <simpleType>
      <restriction base="string">
        <emumeration value="list"/>
        <emumeration value="choice"/>
        <emumeration value="text"/>
        <emumeration value="certificate"/>
        <emumeration value="bin"/>
      </restriction>
    </simpleType>
  </attribute>
  <attribute name="syntax" default="string">
    <simpleType>
      <restriction base="string">
        <enumeration value="boolean"/>
        <enumeration value="string"/>
        <enumeration value="password"/>
        <enumeration value="dn"/>
        <enumeration value="email"/>
        <enumeration value="url"/>
        <enumeration value="numeric"/>
        <enumeration value="percent"/>
        <enumeration value="number"/>
        <enumeration value="decimal_number"/>
        <enumeration value="number_range"/>
        <enumeration value="decimal_range"/>
      </restriction>
    </simpleType>
  </attribute>
  <attribute name="rangeStart" type="string"/>
  <attribute name="rangeStart" type="string"/>
  <attribute name="any" type="string"/>
  <attributeGroup ref="iSMS:i18nIndex"/>
</complexType>
```

```
</element>
<complexType name="GIOStructureDefinition">
<element ref="iSMS:PluginInterface" minOccurs="0" maxOccurs=
"unbounded"/>
<element ref="iSMS:AttributeSchema" minOccurs="0"
maxOccurs="unbounded"/>
<element ref="iSMS:SubSchema" minOccurs="0" maxOccurs=
"unbounded"/>
</complexType>
<element name="SubSchema">
<complexType>
    <complexContent>
        <extension base="iSMS:GIOStructureDefinition">
            <attribute name="name" type="string"/>
            <attribute name="inheritance" default="single">
                <simpleType>
                    <restriction base="string">
                        <enumeration value="single"/>
                        <enumeration value="multiple"/>
                    </restriction>
                </simpleType>
            </attribute>
            <attribute name="maintainPriority" default="no">
                <simpleType>
                    <restriction base="string">
                        <enumeration value="yes"/>
                        <enumeration value="no"/>
                    </restriction>
                </simpleType>
            </attribute>
            <attributeGroup ref="iSMS:i18nIndex"/>
        </extension>
    </complexContent>
</complexType>
</element>
<complexType name="DPUStructureDefinition">
<element ref="iSMS:AttributeSchema" minOccurs="0"
                                        maxOccurs="unbounded"/>
</complexType>
<element name="Configuration">
<complexType>
    <sequence>
        <element name="ServiceURL" minOccurs="0"
                                        maxOccurs="unbounded">
            <complexType>
                <attribute name="name" type="NMTOKEN"
                                        use="required"/>
                <attribute name="url" type="anyURI" use="required"/>
            </complexType>
        </element>
        <element name="PluginSchema" minOccurs="0"
                                        maxOccurs="unbounded">
            <complexType>
                <sequence>
                    <element ref="AttributeSchema"
                        minOccurs="0" MaxOccurs="unbounded"/>
                </sequence>
                <attribute name="name" type="NMTOKEN"
                                        use="required"/>
                <attribute name="interfaceName" type="string"
                                        use="required"/>
                <attribute name="className" type="string"
                                        use="required"/>
                <attribute name="jarURL" type="anyURI"/>
                <attributeGroup name="iSMS:i18nAttributeGroup"/>
                <attributeGroup name="iSMS:i18nIndex"/>
            </complexType>
        </element>
        <element name="GlobalConfiguration"
            type="iSMS:ConfigurationDefinition" minOccurs="0"/>
        <element name="InstanceConfiguration" minOccurs="0"
                                        maxOccurs="unbounded">
            <complexType>
                <complexContent>
                    <extension
                        base="iSMS:ConfigurationDefinition">
                        <attribute name="instanceName"
                            type="NMTOKEN"
                                        use="required"/>
                        <attributeGroup ref="i18nIndex"/>
                    </extension>
                </complexContent>
            </complexType>
        </element>
        <element name="OrganizationConfiguration" minOccurs="0"
                                        maxOccurs="unbounded">
            <complexType>
                <complexContent>
                    <extension
                        base="iSMS:ConfigurationDefinition">
                        <attribute name="organizationName"
                            type="string"
                                        use="required"/>
                        <attributeGroup ref="i18nIndex"/>
                    </extension>
                </complexContent>
            </complexType>
        </element>
    </sequence>
</complexType>
</element>
<complexType name="ConfigurationDefinition">
<sequence>
    <element ref="iSMS:AttributeValuePair" minOccurs="0"
                                        maxOccurs="unbounded"/>
    <element name="PluginConfiguration">
        <complexType>
            <element ref="iSMS:AttributeValuePair" minOccurs="0"
                                        maxOccurs="unbounded"/>
        </complexType>
    </element>
    <element name="SubConfiguration">
        <complexType>
            <complexContent>
                <extension base="iSMS:ConfigurationDefinition">
                    <attribute name="name" type="NMTOKEN"
                                        use="required"/>
                    <attribute name="id" type="NMTOKEN"/>
                    <attribute name="priority"
                        type="positiveInteger"/>
                    <attributeGroup ref="i18nIndex"/>
                </extension>
            </complexContent>
        </complexType>
    </element>
</sequence>
</complexType>
<element name="AttributeValuePair">
<complexType>
    <sequence>
        <element name="Attribute">
            <complexType>
                <attributeName name="name" type="string"
                                        use="required"/>
            </complexType>
        </element>
        <group ref="Values"/>
    </sequence>
</complexType>
</element>
</schema>
```

Figure 8:
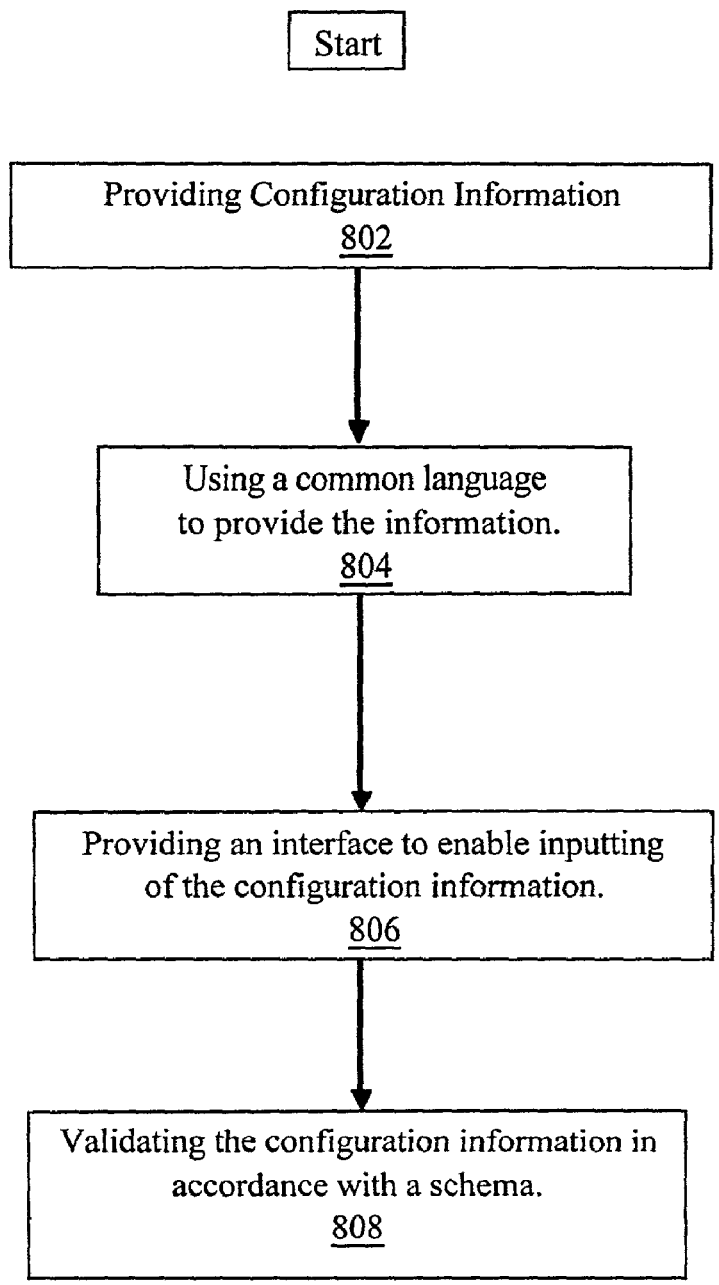
FIG. 8 is a flowchart depicting steps in a method of a service management system for managing configuration information, in accordance with one embodiment of the present invention.

FIG. 8 is a flowchart showing the steps in a method of a service management system for managing configuration information.

In step 802, configuration information is provided. The configuration information is, in one embodiment, regarding a network and the components in a network environment, e.g., networks 50, 51, and 250 of FIGS. 2a, 2b, and 2C, respectively. The configuration information can be related to the network, e.g., IP addresses, protocols, ethernet types. The configuration information can be related to the components within the system, e.g., port numbers.

Other types of configuration information can include, but is not limited to, routing information, bride and switching locations, what backup systems are available, and so on. It is appreciated that there is a nearly endless variety of configuration information that is related to a network and the components within the network.

In step 804, a common language is used to provide the configuration information. In one embodiment of the present invention, extensible markup language (XML) is utilized as the common language. It is appreciated that XML, in one embodiment is used alone. In another embodiment, XML is used in conjunction with other languages, e.g., HTML (hypertext markup language) and Java. It is further appreciated that by using a common language to provide the configuration, incompatibility and non-interpretability problems associated with one language used for one information type and another language used for another information type have been significantly reduced.

In step 806, an interface is provided to enable the inputting of the configuration information. In one embodiment, the interface is a graphical user interface (GUI), such as a web page. In another embodiment, the interface is a command line interface (CLI). It is appreciated the type of interface provided by the present invention is dependent upon the type of configuration information being inputted and dependent upon the entity (human and/or mechanical) inputting the information.

In step 808, the configuration information is validated during inputting. As described in FIG. 5, a validator, e.g., validator 505 checks the information against a schema which defines the characteristics of the configuration information. The schema determines, e.g., how the information is to represented, what values are to be associated with the information. If the information being inputted does not comply with the schema, the entity inputting the information receives an error message. The entity then needs to reevaluate the information being inputted and make any necessary corrections. By providing validation of information during inputting, the possibility of incorrect or improper configuration information being inputted is substantially reduced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of system management comprising:
   providing configuration information relative to components of said system, wherein said components are multiple computers in a network environment, and wherein one of said components is a server computer;
   utilizing a common language to provide said configuration information;
   providing an interface configured to enable inputting of said configuration information to obtain inputted configuration information and configured to enable the managing of said configuration information;
   validating said configuration information while inputting said configuration information into said interface, so as to ensure said configuration information is compliant with a schema of said configuration information; and
   notifying said components of said management system based on a notification request associated with said components,
   wherein the notification request is registered by said components, and
   wherein a listener of said management system provides notification of modification to said components affected by a change of said inputted configuration information if said notification request is registered by said components.

2. The method as recited in claim 1 wherein said providing configuration information further comprises defining a task performed during said system management.

3. The method as recited in claim 1 wherein said providing configuration information further comprises specifying a configuration for said task, said configuration comprising a parameter relative to said task.

4. The method as recited in claim 1 wherein said providing configuration information further comprises declaring said schema for representation of said configuration.

5. The method as recited in claim 1 wherein said common language is extensible markup language.

6. The method as recited in claim 1 wherein said interface is dependent upon said configuration information being inputted and upon an entity inputting said configuration information.

7. The method as recited in claim 1 further comprises switching from a previously operational component which has become a non-operational component to an alternative operational component, said alternative operational component providing information analogous to said previously operational component, and wherein said switching is performed dynamically when said previously operational component becomes non-operational.

8. The method as recited in claim 5 wherein derivates of said extensible markup language can be used as said common language.

9. In a network environment, a method of system management comprising:
   defining tasks performed by a management system of said network environment during system management;
   specifying configurations information for said tasks, said configurations information comprising parameters relative to said tasks;
   declaring schemas for representation of said configurations information, wherein a common language is used for defining said tasks and specifying said configurations information and declaring said schemas;
   using an interface configured to enable the inputting and managing of said configuration information in said system;
   validating said configuration information while inputting said configuration information into said interface, so as to ensure that said configuration information is compliant with said schema; and
   notifying a component of said management system based on a notification request associated with said component, wherein the notification request is registered by said component, and wherein a listener of said management system provides notification of modification to said component affected by a change of said configuration information if said notification request is registered by said component.

10. The network environment of claim 9 wherein said common language is extensible markup language.

11. The network environment of claim 9 wherein said interface is a graphical user interface that is dependent upon said information being inputted and upon an entity inputting said information.

12. The network environment of claim 9 wherein said interface is a command line interface that is dependent upon said information being inputted and upon an entity inputting said information.

13. The network environment of claim 9 wherein said method of server system information management further comprises switching from a previously operational component which has become a non-operational component to an alternative operational component, such that said alternative operational component provides information analogous to said previously operational component, and wherein said switching is performed dynamically when said previously operational component becomes non-operational.

14. The network environment of claim 10 wherein derivates of said extensible markup language can be used as said common language.

15. A computer system in a computer system network, said computer system comprising:
a bus;
a display device coupled to said bus;
a memory unit coupled to said bus; and
a processor coupled to said bus, said processor for performing a method of system management comprising:
providing configuration information relative to components of a management system, wherein said components are multiple computers in a network environment. and wherein one of said components is a server computer in said computer system network;
utilizing a common language to provide said configuration information;
using an interface configured to enable the inputting of said configuration information to obtain inputted configuration information and configured to manage said configuration information, wherein said providing configuration information further comprises specifying a configuration for a task, said configuration comprising a parameter relative to said task;
validating said configuration information while inputting said configuration information into said interface, so as to ensure said configuration information is compliant with a schema of said configuration information; and
notifying said components of said management system based on a notification request associated with said components,
wherein the notification request is registered by said components, and
wherein a listener of said management system provides notification of modification to said components affected by a change of said inputted configuration information if said notification request is registered by said components.

16. The computer system of claim 15 wherein said providing configuration information further comprises defining said task performed by said computer system during said system management.

17. The computer system of claim 15 wherein said providing configuration information further comprises declaring said schema for representation of said configuration.

18. The computer system of claim 15 wherein said common language is extensible markup language.

19. The computer system of claim 15 wherein said interface is dependent upon said configuration information being inputted and upon an entity inputting said configuration information.

20. The computer system of claim 15 wherein said method further comprises switching from a previously operational computer system which has become a non-operational computer system to an alternative computer system within said computer system network, such that said alternative operational computer system provides information analogous to said previously operational computer system, and wherein said switching is performed dynamically when said previously operational system becomes non-operational.

21. The computer system of claim 15 wherein derivates of said extensible markup language can be used as said common language.

22. A computer-usable medium having computer-readable program code embodied therein for causing a computer system in a computer system network to perform a method of system management comprising:
providing configuration information relative to components of a management system, wherein said components are multiple computers in a network environment, and wherein one of said components is a server computer in said computer system network;
utilizing a common language to provide said configuration information;
using an interface configured to enable the inputting of said configuration information to obtain inputted configuration information and configured to manage said configuration information;
validating said configuration information while inputting said configuration information into said interface, so as to ensure said configuration information is compliant with a schema of said configuration information; and
notifying said components of said management system based on a notification request associated with said components,
wherein the notification request is registered by said components, and
wherein a listener of said management system provides notification of modification to said components affected by a change of said inputted configuration information if said notification request is registered by said components.

23. The computer-usable medium of claim 22 wherein said providing configuration information further comprises defining a task performed by said computer system during said system management.

24. The computer-usable medium of claim 22 wherein said providing configuration information further comprises specifying a configuration for said task, said configuration comprising a parameter relative to said task.

25. The computer-usable medium of claim 22 wherein said providing configuration information further comprises declaring said schema for representing said configuration.

26. The computer-usable medium of claim 22 wherein said common language is extensible markup language.

27. The computer-usable medium in claim 22 wherein said interface is dependent upon said configuration information being inputted and upon the entity inputting said configuration information.

28. The computer-usable medium of claim 26 wherein derivatives of said extensible markup language can be used as said common language.

29. The computer-usable medium of claim 22 wherein said method further comprises switching from a previously operational computer system which has become a non-operational computer system to an alternative computer system within said computer system network, such that said alternative operational computer system provides information analogous to said previously operational computer system, and wherein said switching is performed dynamically when said previously operational computer system becomes non-operational.

* * * * *

UNITED STATES PATENT AND TRADEMARK OFFICE
CERTIFICATE OF CORRECTION

| | | |
|---|---|---|
| PATENT NO. | : 7,032,014 B2 | Page 1 of 1 |
| APPLICATION NO. | : 10/053986 | |
| DATED | : April 18, 2006 | |
| INVENTOR(S) | : Pirasenna Thiyagarajan et al. | |

It is certified that error appears in the above-identified patent and that said Letters Patent is hereby corrected as shown below:

On the coversheet:

Under section (75) Inventors, replace "Mrudil P. Uchil" with --Mrudul P. Uchil--

In the Claims:

In Claim 9, column 44 (Line 43), replace "configurations" with --configuration--

In Claim 9, column 44 (Line 44), replace "configurations" with --configuration--

Signed and Sealed this

Twenty-fifth Day of July, 2006

JON W. DUDAS
*Director of the United States Patent and Trademark Office*